United States Patent
Lo et al.

(10) Patent No.: US 11,950,283 B2
(45) Date of Patent: *Apr. 2, 2024

(54) DEVICE AND METHOD FOR HANDLING CHANNEL ACCESS PROCEDURE

(71) Applicant: Acer Incorporated, New Taipei (TW)

(72) Inventors: Li-Chung Lo, New Taipei (TW); Chien-Min Lee, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/827,961

(22) Filed: May 30, 2022

(65) Prior Publication Data
US 2022/0295556 A1  Sep. 15, 2022

Related U.S. Application Data

(62) Division of application No. 16/671,183, filed on Nov. 1, 2019, now Pat. No. 11,382,129.

(60) Provisional application No. 62/757,173, filed on Nov. 8, 2018.

(51) Int. Cl.
*H04W 74/08* (2009.01)
*H04W 72/51* (2023.01)
*H04W 72/56* (2023.01)
*H04W 74/0808* (2024.01)
*H04W 72/04* (2023.01)

(52) U.S. Cl.
CPC ....... *H04W 74/0808* (2013.01); *H04W 72/51* (2023.01); *H04W 72/56* (2023.01)

(58) Field of Classification Search
None
See application file for complete search history.

(56) References Cited

U.S. PATENT DOCUMENTS

| | | | |
|---|---|---|---|
| 9,819,430 B2 | 11/2017 | Zukunft et al. | |
| 10,912,128 B2* | 2/2021 | Li | H04W 88/08 |
| 11,057,928 B2* | 7/2021 | Mukherjee | H04W 74/006 |
| 2017/0230944 A1* | 8/2017 | Babaei | H04W 74/0808 |

(Continued)

FOREIGN PATENT DOCUMENTS

| | | |
|---|---|---|
| EP | 3 319 244 A1 | 5/2018 |
| TW | I602404 B | 10/2017 |
| WO | 2018/199685 A1 | 11/2018 |

OTHER PUBLICATIONS

LG Electronics, LBT schemes in LAA UL, 3GPP TSG RAN WG1 meeting #84, Feb. 15-19, 2016, St Julian's, Malta, R1-160630, XP051 064267.

(Continued)

*Primary Examiner* — Eunsook Choi
(74) *Attorney, Agent, or Firm* — McClure, Qualey & Rodack, LLP

(57) ABSTRACT

A device for handling channel access procedure includes a storage device and a processing circuit coupled to the storage device and configured to execute instructions stored in the storage device. The storage device is configured for storing the instructions of receiving an indication for an uplink transmission; determining at least one parameter of the device for a listen-before-talk procedure according to a capability of the device or a signaling from a base station; and performing the uplink transmission according to the indication.

13 Claims, 18 Drawing Sheets

(56) References Cited

U.S. PATENT DOCUMENTS

| | | | |
|---|---|---|---|
| 2017/0359808 A1* | 12/2017 | Dinan | H04L 5/0053 |
| 2018/0115996 A1 | 4/2018 | Si et al. | |
| 2019/0141693 A1* | 5/2019 | Guo | H04W 16/14 |
| 2019/0182681 A1* | 6/2019 | Ansari | H04W 74/0808 |
| 2019/0191460 A1* | 6/2019 | Chendamarai Kannan | H04W 74/0816 |
| 2019/0215140 A1* | 7/2019 | Hafeez | H04W 72/046 |
| 2019/0215865 A1* | 7/2019 | Li | H04L 5/0055 |
| 2019/0230706 A1* | 7/2019 | Li | H04B 7/088 |
| 2020/0036422 A1* | 1/2020 | Li | H04W 74/0808 |
| 2020/0107364 A1 | 4/2020 | Xue et al. | |
| 2020/0146063 A1* | 5/2020 | Xu | H04W 24/08 |
| 2020/0275484 A1* | 8/2020 | Xu | H04W 74/0808 |
| 2020/0314906 A1* | 10/2020 | Goyal | H04B 7/0695 |
| 2020/0367242 A1 | 11/2020 | Moon et al. | |
| 2021/0045144 A1* | 2/2021 | Kim | H04W 72/23 |
| 2021/0058967 A1* | 2/2021 | Oteri | H04W 16/14 |
| 2021/0153245 A1* | 5/2021 | Tooher | H04W 74/006 |
| 2021/0194756 A1* | 6/2021 | Babaei | H04B 7/088 |

OTHER PUBLICATIONS

Vivo, Discussion on the channel access procedures, 3GPP TSG RAN WG1 Meeting #93, May 21-25, 2018, Busan, Korea, R1-1806086, XP051462350.

Interdigital Inc., On LBT for Beam-Based Transmission for NR-U, 3GPP TSG RAN WG1 Meeting #92bis, Apr. 16-20, 2018, Sanya, China, R1-1804885, XP051427148.

Chinese language office action dated Mar. 12, 2021, issued in application No. TW 108140390.

\* cited by examiner

US 11,950,283 B2

DEVICE AND METHOD FOR HANDLING CHANNEL ACCESS PROCEDURE

CROSS REFERENCE TO RELATED APPLICATIONS

This application is a divisional of U.S. patent application Ser. No. 16/671,183, filed Nov. 1, 2019 and entitled "DEVICE AND METHOD FOR HANDLING CHANNEL ACCESS PROCEDURE", now U.S. Pat. No. 11,382,129, the entirety of which is incorporated by reference herein.

BACKGROUND OF THE INVENTION

Field of the Invention

The present invention relates to a device and method used in a wireless communication system, and more particularly, to a device and method for handling channel access in an unlicensed band.

Description of the Related Art

With the advance of wireless communication technology, long-term evolution (LTE) could be of crucial importance because of its peak data rate and throughput by using advanced techniques, such as carrier aggregation (CA), dual connectivity, licensed-assisted access (LAA), and so on.

In the LAA, a base station transmits an uplink (UL) grant during a channel occupancy time on an unlicensed carrier, to the UE. The UE performs a listen-before-talk (LBT) procedure (also referred to as a channel access procedure or clear channel assessment) before performing the UL transmission in the channel occupancy time on the unlicensed carrier.

On the other hand, the beam may have beam direction and beamwidth attributes. Compared to the UE having restricted beamwidth due to hardware restriction, a base station may have more flexibility on adjusting its beamwidth in order to provide various services. This may lead to fairness problems. Additionally, when different UL transmissions requiring different beam directions are overlapped or spaced apart by a limited time interval, the UE able to focus its beam in only one beam direction at a time may find out the infeasibility to perform the LBT procedure. In the prior art, it is not clear how to handle the LBT procedure in a complex beam direction or beamwidth condition.

BRIEF SUMMARY OF THE INVENTION

The present invention therefore provides a device and method for handling channel access in an unlicensed band to solve the abovementioned problems.

A device for handling channel access procedure includes a storage device and a processing circuit coupled to the storage device and configured to execute instructions stored in the storage device. The storage device is configured for storing the instructions of receiving an indication for an uplink transmission; and determining at least one parameter of the device for a listen-before-talk procedure according to a capability of the device or a signaling from a base station; and performing the uplink transmission according to the indication.

A device for handling channel access procedure includes a storage device and a processing circuit coupled to the storage device and configured to execute instructions stored in the storage device. The storage device is configured for storing the instructions of determining a first spatial domain filter for a first uplink transmission; and determining a second spatial domain filter for a second uplink transmission.

A method for handling channel access procedure includes receiving an indication for an uplink transmission; and determining at least one parameter of the device for a listen-before-talk procedure according to a capability of the device or a signaling from a base station; and performing the uplink transmission according to the indication.

A method for handling channel access procedure includes determining a first spatial domain filter for a first uplink transmission; and determining a second spatial domain filter for a second uplink transmission.

These and other objectives of the present invention will no doubt become obvious to those of ordinary skill in the art after reading the following detailed description of the preferred embodiment that is illustrated in the various figures and drawings.

DETAILED DESCRIPTION OF THE INVENTION

Figure 1:
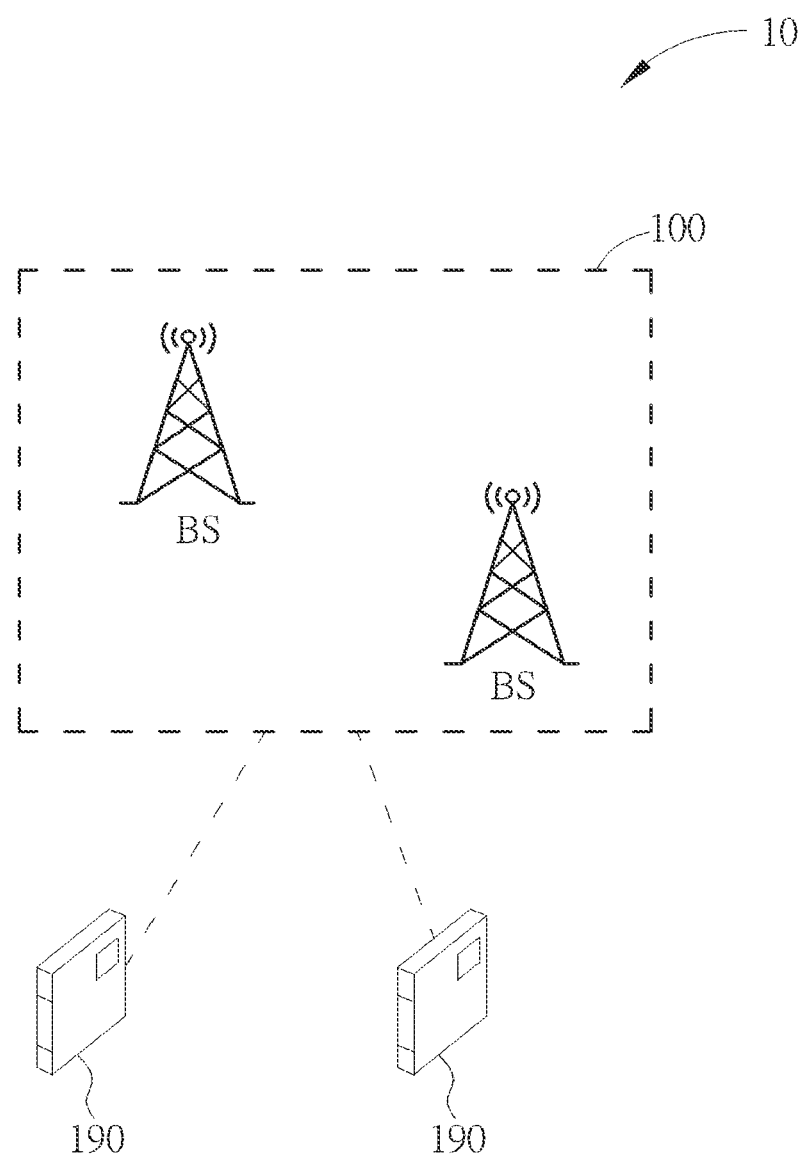
FIG. 1 is a schematic diagram of a wireless communication system according to an example of the present invention.

FIG. 1 is a schematic diagram of a wireless communication system 10 according to an example of the present invention. The wireless communication system 10 briefly includes a network 100 and a plurality of communication devices 190. The network 100 and a communication device 190 may communicate with each other via one or more carriers of licensed band(s) and/or unlicensed band(s).

In FIG. 1, the network 100 and the communication devices 190 are simply utilized for illustrating a structure of the wireless communication system 10. The network 100 may include at least one base station BS to communicate with a communication device 190. The network 100 may be a radio access network (RAN) including at least one evolved Node-B (eNB) and/or gNB (also referred to as 5G BS or new radio (NR) BS). In general, a base station BS may also be used to refer any of the eNB and the gNB.

A communication device 190 may be a user equipment (UE), a machine type communication (MTC) device, a mobile phone, a laptop, a tablet computer, an electronic book, a portable computer system, a vehicle, or an aircraft. In addition, each of the base stations BS and the communication devices 190 may be seen as either a transmitter or a receiver according to transmission direction. For an uplink (UL), the communication device 190 is the transmitter and the network 100 is the receiver. For a downlink (DL), the network 100 is the transmitter and the communication device 190 is the receiver.

Figure 2:
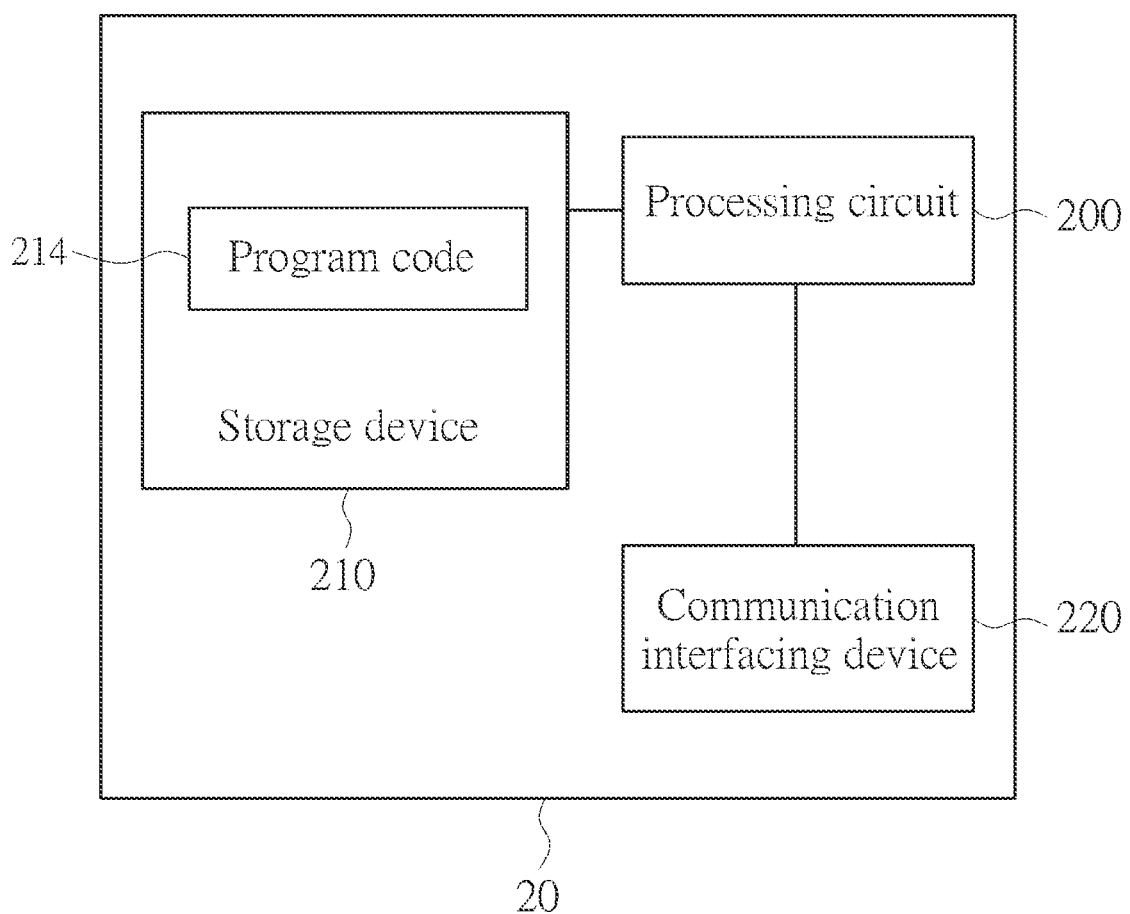
FIG. 2 is a schematic diagram of a device according to an example of the present invention.

FIG. 2 is a schematic diagram of a device 20 according to an example of the present invention. The device 20 may be a communication device 190 or the base station BS shown in FIG. 1, but is not limited herein. The device 20 may include a processing circuit 200 such as a microprocessor or Application Specific Integrated Circuit (ASIC), a storage device 210 and a communication interfacing device 220. The storage device 210 may be any data storage device that may store a program code 214 to be accessed and executed by the processing circuit 200. Examples of the storage device 210 include but are not limited to a subscriber identity module (SIM), read-only memory (ROM), flash memory, random-access memory (RAM), hard disk, optical data storage device, non-volatile storage device, non-transitory computer-readable medium, etc. The communication interfacing device 220 includes at least one transceiver and is used to transmit and receive signals (for instance, data, messages and/or packets) according to processing results of the processing circuit 200.

Figure 3:
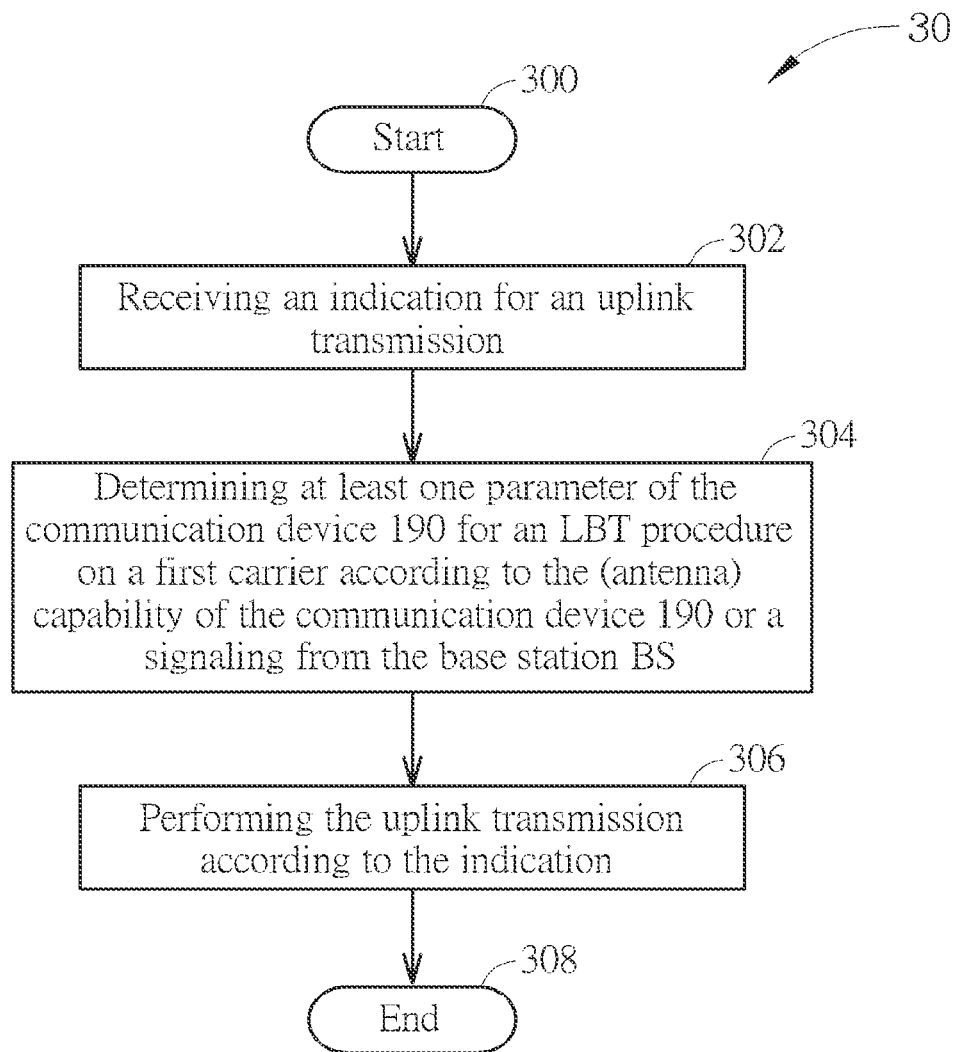
FIG. 3 is a flowchart of a method according to an example of the present invention.

FIG. 3 is a flowchart of a method 30 according to an example of the present invention. The method 30 may be utilized in a communication device 190, for handling a listen-before-talk (LBT) procedure (also referred to as a channel access procedure) in an unlicensed band. The method 30 includes the following steps:

Step 300: Start.

Step 302: Receiving an indication for an uplink transmission.

Step 304: Determining at least one parameter of the communication device 190 for an LBT procedure on a first carrier according to the (antenna) capability of the communication device 190 or a signaling from the base station BS.

Step 306: Performing the uplink transmission according to the indication.

Step 310: End.

In the method 30, the communication device 190 may report its (antenna) capability to the base station BS. In some embodiments, the communication device 190 reports its (antenna) capability through a signal (for example, a signal SS shown in FIG. 4) such as a radio resource control (RRC) signal. In some embodiments, the (antenna) capability of the communication device 190 may include beamwidth of the communication device 190. Here, beamwidth (also referred to as 3 dB beamwidth or half power beamwidth) in antenna radiation pattern is the angle between opposite half-power (−3 dB) points of a main lobe with respect to the peak effective radiated power of the main lobe. In some embodiments, the beamwidth of the communication device 190 may be around X degrees (for example, X=30, or X=60) or in a range of Y degrees to Z degrees (for example, Y=30, Z=60). In some embodiments, the beamwidth of communication device 190 may be wide beamwidth (for example, the beamwidth may be limited as, for example, around 60 degrees), narrow beamwidth (for example, the beamwidth may be limited as (or within), for example, around 30 degrees), or variable beamwidth. The communication device 190 having variable beamwidth may switch its beam shape between wide beamwidth and narrow beamwidth. In some embodiments, the (antenna) capability of the communication device 190 may include spatial domain filter type of the communication device 190. The spatial domain filter type may be categorized into spatial domain filter type one (which corresponds to narrow beamwidth), spatial domain filter type two (which corresponds to wide beamwidth), and spatial domain filter type three (which corresponds to variable beamwidth).

Subsequently, the base station BS may perform a (base station side) (directional) LBT (for instance, Cat-4 LBT) procedure (for example, an LBT procedure BSLBT shown in FIG. 4) in an unlicensed band to reserve a channel occupancy time (for example, a channel occupancy time CCT shown in FIG. 4). In Step 302, the communication device 190 may receive an indication for a UL transmission (for example, a UL transmission ULT shown in FIG. 4). In some embodiments, the base station BS may perform a DL transmission (for example, a DL transmission DLT shown in FIG. 4) during the channel occupancy time CCT. In some embodiments, the base station BS may transmit a UL grant related downlink control information (DCI) (for example, a UL grant related DCI 410 shown in FIG. 4) during the channel occupancy time CCT. The UL grant related DCI 410 instructs the communication device 190 to perform a UL transmission (for example, a UL transmission ULT shown in FIG. 4). The UL grant related DCI 410 may be transmitted by the base station BS to the communication device 190 in the unlicensed band. The UL grant related DCI 410 may be transmitted by the base station BS on a physical DL control channel (PDCCH).

The communication device 190 may share the channel occupancy time CCT. Before the UL transmission ULT in response to the UL grant related DCI 410, the communication device 190 may also perform a (communication device side) (directional) LBT procedure (for example, an LBT procedure CDLBT shown in FIG. 4) in the unlicensed band during the channel occupancy time CCT. By means of the LBT procedure CDLBT, the communication device 190 senses and determines whether the unlicensed band is available or not. If available, the communication device 190 may then perform the UL transmission ULT in the unlicensed band during the channel occupancy time CCT in Step 306 if the LBT procedure CDLBT for the UL transmission ULT is successful. The communication device 190 may perform one shot (or short) LBT procedure CDLBT, which may last for example for 25 us, according to, for example, a command from the base station BS. Particularly, the LBT procedure CDLBT performed by the communication device 190 is shorter than the LBT procedure BSLBT performed by the base station BS.

On the other hand, different from the communication device 190 having restricted beamwidth due to hardware restriction, the base station BS may have more flexibility on adjusting its beamwidth in order to provide various services. When the base station BS performs the LBT procedure BSLBT with narrow beamwidth, it may filter certain nodes (for example, nodes 450 shown in FIG. 4) outside its beam coverage and there would be less interference detected by the base station BS. The nodes 450 may be a communication device 190 or the base station BS shown in FIG. 1, but is not limited herein. If the communication device 190 performs the LBT procedure CDLBT with wide beamwidth, it may cover more nodes 450 within its beam coverage than the base station BS does. The communication device 190 should evaluate interference during the LBT procedure CDLBT to be higher than the interference evaluation conducted by the base station BS during the LBT procedure BSLBT, and therefore aborts the following UL transmission ULT. However, the communication device 190 may detect little interference as it performs a shorter directional LBT procedure CDLBT. This may lead to fairness problem among radio access technologies. For example, the nodes 450 which is covered by the communication device 190 but exposed by the base station BS may experience unfairness because interference detected by the nodes 450 increases when the communication device 190 insists to perform the UL transmission ULT.

To solve the fairness problem, the communication device 190 may adjust its parameter for the LBT procedure CDLBT according to its (antenna) capability in Step 304. In some embodiments, the communication device 190 adjusts at least one parameter of the communication device 190 for the LBT procedure CDLBT according to the (antenna) capability of the communication device 190 in Step 304. In some embodiments, the communication device 190 determines or adjusts at least one parameter of the communication device 190 for the LBT procedure CDLBT according to signaling from the base station BS in Step 304.

An LBT procedure may involve energy detection to determine if a channel is occupied. In some embodiments, the at least one parameter of the communication device 190 may thus include an (energy detection) threshold during the LBT procedure CDLBT. The communication device 190 may adjust the (energy detection) threshold according to its capability and/or signaling from the base station BS. FIG. 4 is a schematic diagram associated with the method 30 shown in FIG. 3. In FIG. 4, a dashed thin line with dots denotes approximate extent of the beam coverage of the base station BS for the LBT procedure BSLBT, and a dashed thick line with dots denotes approximate extent of the beam coverage of the communication device 190 for the LBT procedure CDLBT. It should be clearly understood that the beam coverage may have other shapes and is not limited to those shown in FIG. 4.

Figure 4:
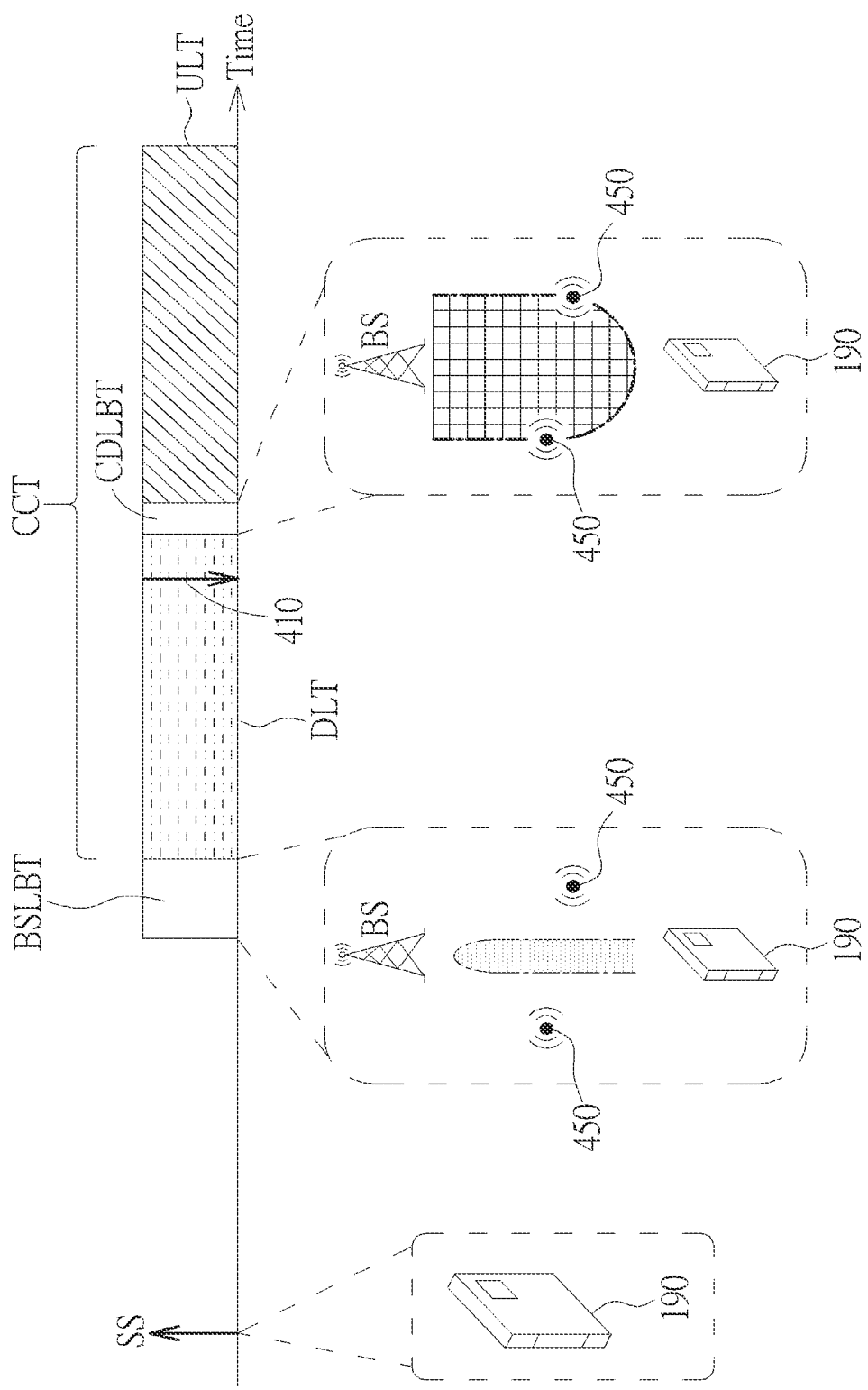
FIG. 4 to FIG. 8 are schematic diagrams associated with the method shown in FIG. 3.

In FIG. 4, the communication device 190 may report its (antenna) capability which belongs to wide beamwidth through a signal SS. In some embodiments, the UL grant related DCI 410 may include a field (for example, a field THindicator) to indicate the (energy detection) threshold (for example, a threshold THadj) for the communication device 190 to perform the LBT procedure CDLBT. In some embodiments, the field THindicator in the UL grant related DCI 410 may be related to the (antenna) capability of the communication device 190. The field THindicator in the UL grant related DCI 410 may be an N bit (for instance, N=2) information, and may be, for instance, 00, 01, 10, or 11. In some embodiments, the (energy detection) threshold (for example, the threshold THadj) may be configured by higher layer signals such as RRC and/or medium access control (MAC) signal, and thus may not be indicated in the UL grant related DCI 410. The communication device 190 may perform the LBT procedure CDLBT with wide beamwidth according to the (energy detection) threshold of lower energy level before the UL transmission ULT.

If the (energy detection) threshold during the LBT procedure CDLBT is low, the communication device 190 tends to determine that the interference is high. It is because the intensity of noises detected by the communication device 190 is more easily to be higher than the (energy detection) threshold. In other words, the communication device 190 of wide beamwidth is more sensitive to certain nodes 450 within the beam coverage of the communication device 190 when the (energy detection) threshold during the LBT procedure CDLBT is low. This prevents the communication device 190 from performing the following UL transmission ULT, and thus the channel would not be occupied by the communication device 190. In this manner, the fairness problem is alleviated.

Figure 5:
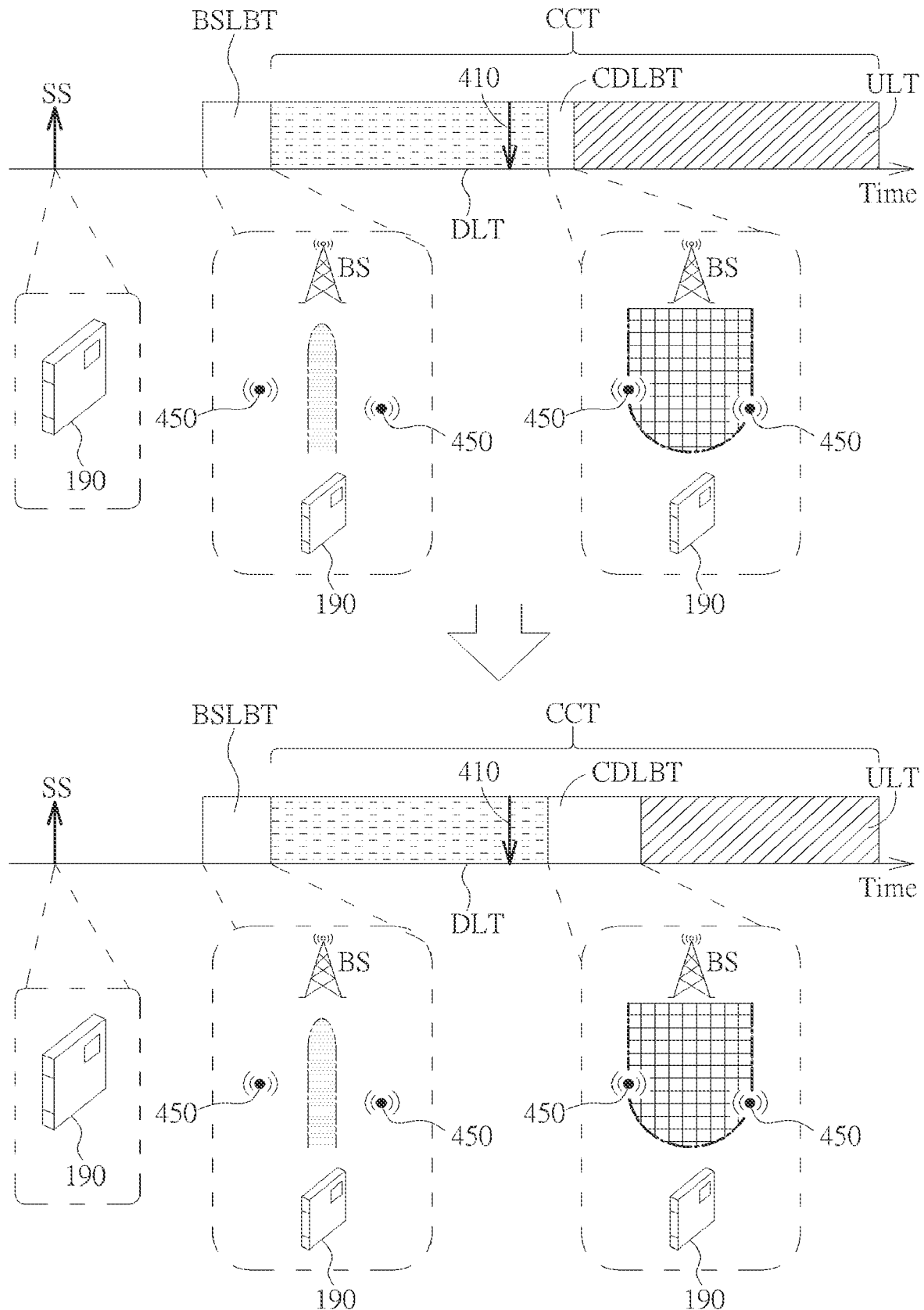

A channel sensing time may be a length of time that the LBT procedure CDLBT lasts or continues. The channel sensing time may correspond to a contention window (CW) size. The channel sensing time may be a contention window or sensing interval. In some embodiments, the at least one parameter of the communication device 190 may thus include a channel sensing time for the LBT procedure CDLBT. The communication device 190 may adjust the channel sensing time for the LBT procedure CDLBT according to its capability and/or signaling from base station BS. FIG. 5 is a schematic diagram associated with the method 30 shown in FIG. 3. The transmission sequences before and after adjustment of the channel sensing time in the time domain are illustrated at the top and bottom of FIG. 6 respectively. In FIG. 5, the communication device 190 may report its (antenna) capability which belongs to wide beamwidth through a signal SS. In some embodiments, the UL grant related DCI 410 may include information about the channel sensing time for the communication device 190 to perform the LBT procedure CDLBT. In some embodiments, the base station BS may instruct which kinds of long (or short) LBT procedure the communication device 190 should perform or how long the LBT procedure CDLBT should be. In some embodiments, the information about the channel sensing time may be configured by higher layer signals such as RRC and/or MAC signal, and thus may not be indicated in the UL grant related DCI 410.

In some embodiments, the communication device 190 may perform the LBT procedure CDLBT with wide beamwidth in the duration of longer channel sensing time before UL transmission ULT. In some embodiments, the information about the channel sensing time may exclude one shot LBT procedure, which is about 25 microseconds in terms of the channel sensing time, when the communication device 190 reports its (antenna) capability is limited to wide beamwidth. When the communication device 190 performs the LBT procedure CDLBT with wider beamwidth, the communication device 190 listens longer so as to determine the surrounding interfere more accurately. That is to say, the communication device 190 is more sensitive to certain nodes 450 within the beam coverage of the communication device 190 when the longer channel sensing time extends. Besides, the communication device 190 tends to determine that the interference is high. This prevents the communication device 190 from performing the following UL transmission ULT, and thus the channel would not be occupied by the communication device 190. In this manner, the fairness problem is alleviated.

On the other hand, the narrower the beamwidth, the fewer the nodes 450 covered within the beam coverage of the communication device 190. In this case, even short channel sensing time may be enough. In some embodiments, the communication device 190 may perform the LBT procedure CDLBT with narrow beamwidth in the duration of shorter channel sensing time before UL transmission ULT. In some embodiments, the information about the channel sensing time may include one shot LBT procedure, which is about 25 microseconds in terms of the channel sensing time, when the communication device 190 reports its (antenna) capability is narrow beamwidth. When the communication device 190 is able to provide beams of narrow beamwidth, interference may be reduced, and one shot LBT procedure or short LBT procedure is allowed, meaning that the contention window size may be small. The fairness problem is not severe. In some embodiments, the communication device 190 with wider beamwidth (or with narrower beamwidth) itself knows that the listening step should last longer (shorter). In such a situation, there is no need for the base station BS to instruct the communication device 190 to listen longer (or shorter). The communication device 190 defaults to spend more (or less) time on listening; moreover, the channel sensing time is long (or short).

Figure 6:
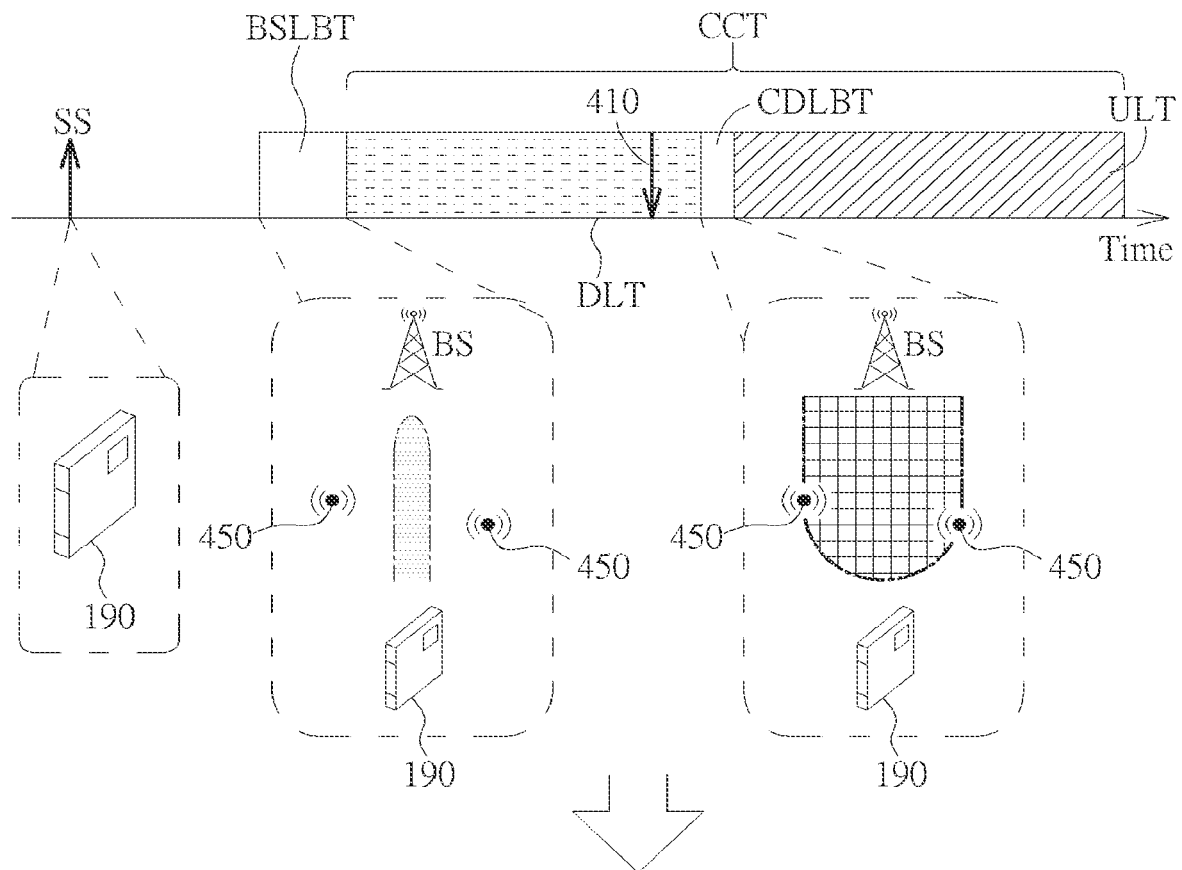
Figure 6:
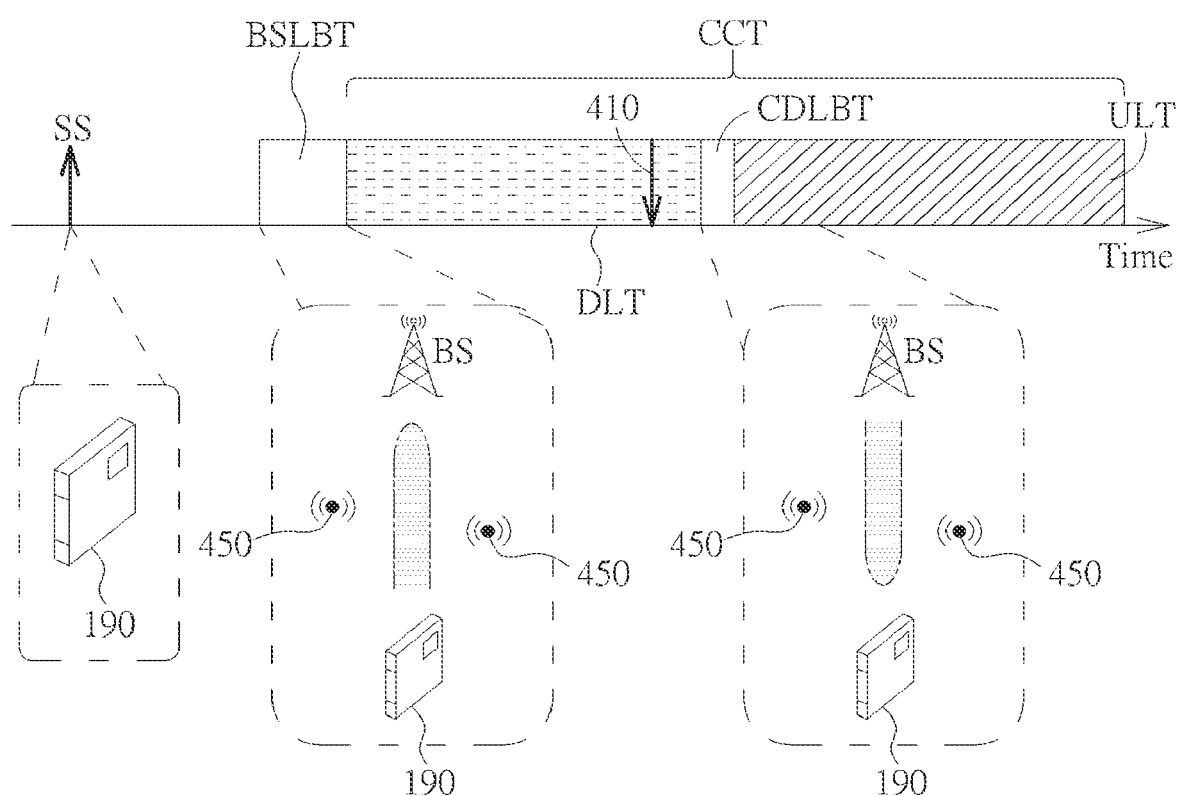

If the beamwidth of the communication device 190 is variable, beamwidth adjustment is a more direct approach to solve the fairness problem. In some embodiments, the at least one parameter of the communication device 190 includes beamwidth for the communication device 190 to perform the LBT procedure CDLBT. In some embodiments, the at least one parameter of the communication device 190 may include spatial domain filter type for the communication device 190 to perform the LBT procedure CDLBT. The communication device 190 may adjust its beamwidth corresponding to a spatial domain filter type according to its capability and/or signaling from the base station BS. FIG. 6 is a schematic diagram associated with the method 30 shown in FIG. 3. The transmission sequences before and after beamwidth adjustment in the time domain are illustrated at the top and bottom of FIG. 6 respectively.

In FIG. 6, through a signal SS, the communication device 190 may report its (antenna) capability which belongs to variable beamwidth, meaning that the communication device 190 may switch between wide beamwidth and narrow beamwidth and that the spatial domain filter type three is adopted. Information about beamwidth adjustment and/or quasi co-location (QCL) assumption for the LBT procedure CDLBT may be transmitted by means of the UL grant related DCI 410. When the beamwidth of base station BS performing LBT procedure BSLBT is narrow, the communication device 190 performs the LBT procedure CDLBT with narrow beamwidth before the UL transmission ULT. Likewise, when the beamwidth of base station BS performing LBT procedure BSLBT is wide, the communication device 190 changes its beamwidth and performs the LBT procedure CDLBT with wide beamwidth before the UL transmission ULT. In this manner, the fairness problem is alleviated.

In some embodiments, the communication device 190 employs a narrow beam for a UL sounding transmission and an LBT procedure CDLBT prior to the UL sounding transmission, the base station BS instructs the communication device 190 to perform a UL data transmission and an LBT procedure CDLBT prior to the UL data transmission with narrow beam. In some embodiments, the base station BS performs the LBT procedure BSLBT with narrow beamwidth, and the base station BS instructs the communication device 190 to employ narrow beams for a UL sounding transmission, an LBT procedure CDLBT prior to the UL sounding transmission, a UL data transmission and an LBT procedure CDLBT prior to the UL data. Namely, the beamwidth for the UL sounding transmission is associated with that for the UL data transmission. Information about beamwidth adjustment for the LBT procedure CDLBT may be transmitted by means of the UL grant related DCI 410 such as sound reference signal (SRS) for channel status information (CSI) measurement and Physical downlink share channel (PUSCH) scheduling. In some embodiments, the beamwidth for the LBT procedure CDLBT is no less than the beamwidth for the UL transmission ULT. In some embodiments, the beamwidth range (or beam coverage) for the LBT procedure CDLBT includes the beamwidth range (or beam coverage) for the UL transmission ULT.

Figure 7:
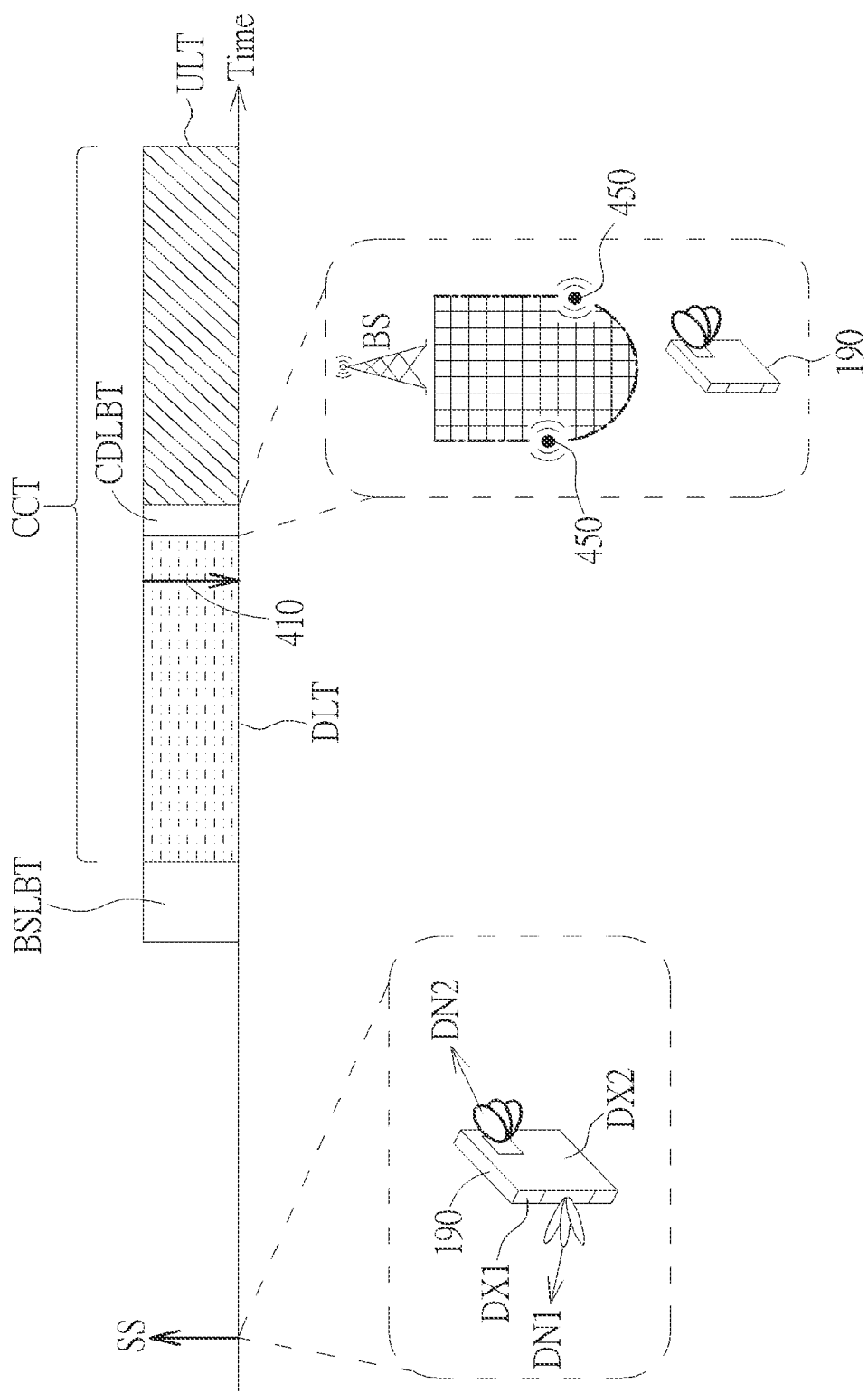
Figure 8:
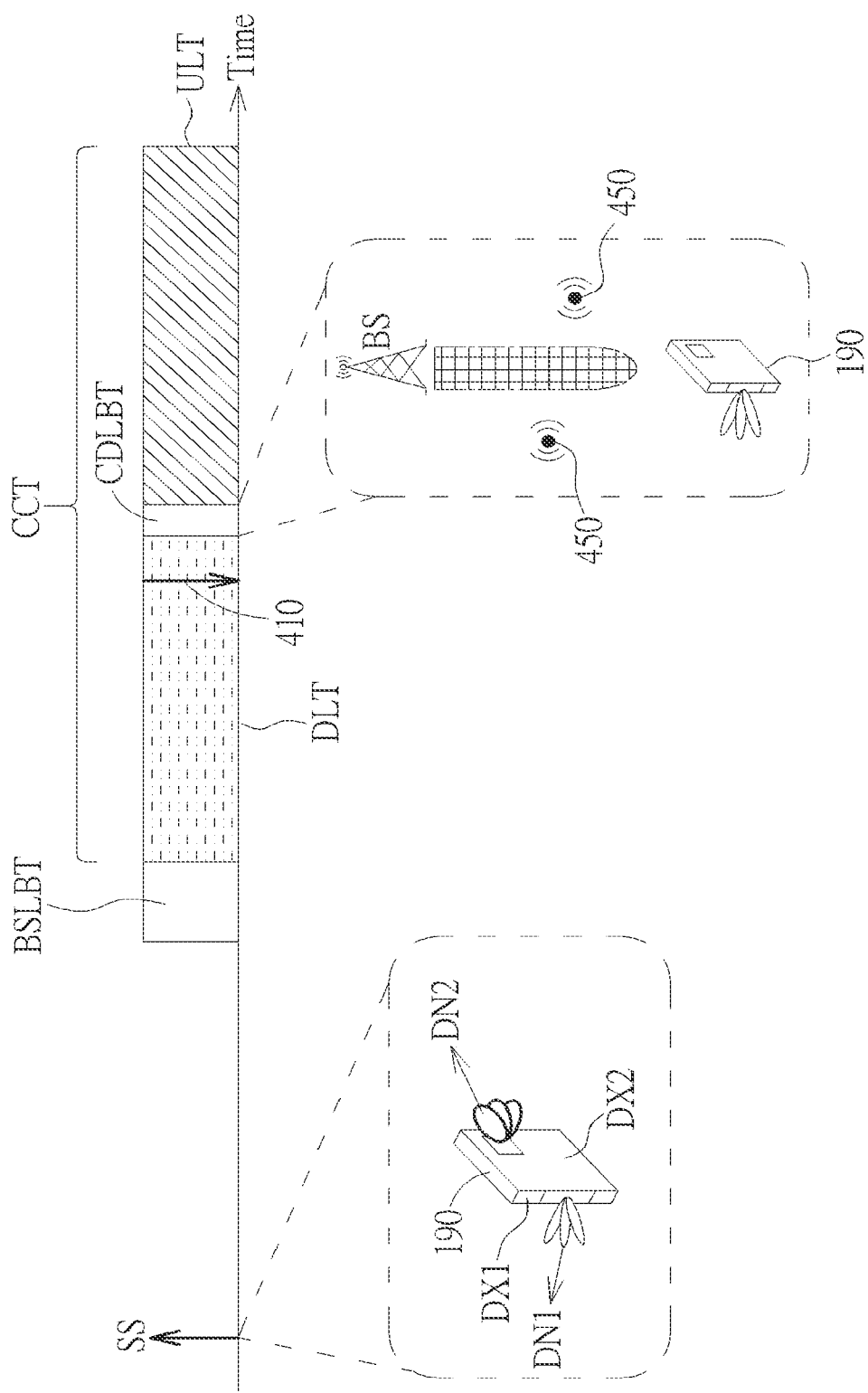

In some embodiments, the at least one parameter of the communication device 190 (or the capability of the communication device 190) may include a relation between its beamwidth and its beam direction. The pointing direction of a particular beam which radiates the signal is defined as the beam direction. A beamforming pointing direction (or beam peak direction) may be the geometric center of the half-power contour of the beam. Specifically, please refer to FIG. 7 and FIG. 8. FIG. 7 and FIG. 8 are schematic diagrams associated with the method 30 shown in FIG. 3. According to FIG. 7 and FIG. 8, the communication device 190 may have more than one panel for transmission or reception, and each panel may have different antenna layouts which may cause different radiation patterns. The antenna beam from a panel of a specific panel index is steered into a specific beam direction; namely, the beam direction (and the beamwidth) is related to the panel index. In FIG. 7 and FIG. 8, the communication device 190 may report its panel indexes and its corresponding (antenna) capability, which is beamwidth related, through a signal SS in Step 302. For example, panel index DX1 may correspond to a narrow beamwidth and a beam direction DN1, and panel index DX2 may correspond to a wide beamwidth and a beam direction DN2.

In FIG. 7, the communication device 190 may adjust the (energy detection) thresholds according to its capability and/or signaling from the base station BS in Step 304. Each of the (energy detection) thresholds corresponds to a panel index. Information about the (energy detection) thresholds corresponding to the panel indexes of communication device 190 may be transmitted by means of the UL grant related DCI 410. The communication device 190 may perform the LBT procedure CDLBT with wide beamwidth according to the (energy detection) threshold of lower energy level before the UL transmission ULT. When the communication device 190 performs the LBT procedure CDLBT with the panel index DX2 corresponding to wide beamwidth, it may cover certain nodes 450 within its beam coverage. Nevertheless, by decreasing the (energy detection) threshold during the LBT procedure CDLBT, the fairness problem is alleviated.

In FIG. 8, the communication device 190 may adjust the channel sensing time (or the contention window sizes) according to its capability and/or LBT type indicated by the base station BS in Step 304. Each of the channel sensing time corresponds to a panel index. Information about the LBT type may be transmitted by means of the UL grant related DCI 410. The LBT type in the UL grant related DCI 410 may be an N bit (for instance, N=2) information, and may be, for instance, 00, 01, 10, or 11. The communication device 190 may determine the contention window size according to the LBT type and/or panel index. In some embodiments, the contention window size may be configured by higher layer signals such as an RRC and/or MAC signal, and thus may not be indicated in the UL grant related DCI 410. Furthermore, the contention window sizes corresponding to different panel indexes but the same LBT type may be identical, similar, or different. The communication device 190 may perform the LBT procedure CDLBT according to the panel index and/or LBT type indicated by base station BS before UL transmission ULT. When the communication device 190 performs the LBT procedure CDLBT with the panel index DX1 corresponding to narrow beamwidth, it may filter certain nodes 450 outside its beam coverage. The channel sensing time may remain short without creating the fairness problem.

With the method 30, fairness problems, which occur when the communication device 190 performs a shorter LBT procedure (for instance, according to the indication from the base station BS) without taking its beamwidth (of each panel) into account, may be prevented.

Figure 9:
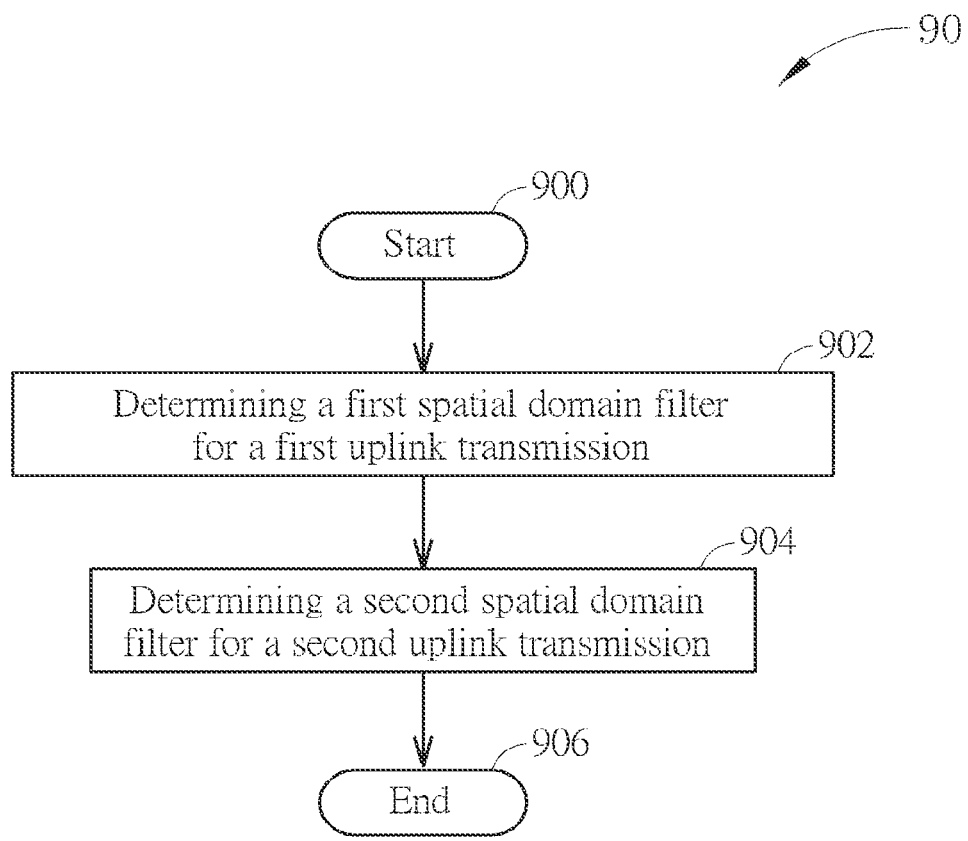
FIG. 9 is a flowchart of a method according to an example of the present invention.

FIG. 9 is a flowchart of a method 90 according to an example of the present invention. The method 90 may be utilized in a communication device 190, for handling an LBT procedure in an unlicensed band. The method 90 includes the following steps:

Step 900: Start.

Step 902: Determining a first spatial domain filter for a first uplink transmission.

Step 904: Determining a second spatial domain filter for a second uplink transmission.

Step 906: End.

In current NR system, different channel(s) and/or signal(s) may be transmitted with different beam directions (for example, according to different QCL assumption and/or via different spatial domain filters). Besides, the communication device 190 may be served with a plurality of transmission reception points (TRPs) so as to enhance spectrum efficiency. For example, the communication device 190 may transmit physical uplink control channel (PUCCH) to a TRP and may dynamically transmit PUSCH to the TRP and/or another TRP according to UL CSI. Accordingly, before a UL transmission (for example, a first UL transmission ULT1 or a second UL transmission ULT2 shown in FIG. 10) during the channel occupancy time, the communication device 190 may receive a beam indicator indicating a beam direction or a spatial domain filter to perform the following UL transmission (that is, the first UL transmission ULT1 or the second UL transmission ULT2) in the method 90. In some embodiments, the communication device 190 may receive a beam indicator indicating a beam direction or a spatial domain filter to perform a PUCCH transmission through RRC layer and/or MAC layer signal(s). In some embodiments, the communication device 190 may receive a beam indicator indicating a beam direction or a spatial domain filter to perform a PUSCH transmission (for data transmission) through DCI. In some embodiments, the communication device 190 may receive a beam indicator indicating a beam direction or a spatial domain filter to perform an (Aperiodic) SRS transmission (for UL CSI acquisition) through RRC layer signal(s). In some embodiments, the first beam indicator or the second beam indicator may be SRS resource indicator (SRI), spatial relation information, spatial relation assumption, or spatial domain transmission filter. In some embodiments, the first beam indicator or the second beam indicator may be DCI. In some embodiments, the beam directions or spatial domain filters may be determined by configuration of the base station BS from different layers such as RRC layer, MAC layer and/or Physical layer by DCI. Correspondingly, in some embodiments, the communication device 190 may determining a first spatial domain filter for a first uplink transmission and determining a second spatial domain filter for a second uplink transmission in Step 902 or step 904.

Chances are that different UL transmissions for different channels/signals may be overlapped or spaced apart by a limited distance (for example, a time interval DST shown in FIG. 10) in time domain. For example, the time interval (or time distance) DST between the first UL transmission ULT1 to be performed and the second UL transmission ULT2 to be performed is less than a duration standard. However, it may be required for the communication device 190 to perform an LBT procedure (for example, an LBT procedure CDLBT shown in FIG. 10) in an unlicensed band with limited number of beam direction(s) or spatial domain filter(s) because of implementation limitation and/or power saving of the communication device 190. Particularly, in some embodiments, the communication device 190 is able to perform a UL transmission or an LBT procedure in only one beam direction at a time. Namely, beam from the communication device 190 may only focus in one beam direction at a time, and the beam-formed transmission may only be done in one beam direction at a time. The communication device 190 may find out the infeasibility of one LBT procedure for different UL transmissions of different UL channels/signals with different beam directions according to the short time interval DST between the two channels/signals or the (partial) overlap between the two channels/signals. In some embodiments, the duration standard may be pre-determined (for instance, in the specification) or configured by the base station BS. In some embodiments, the length of the duration standard may depend on the type of UL channel(s)/signal(s). For example, the duration standard before a PUCCH transmission should be more than 16 microseconds for an LBT procedure. The duration standard before a PUSCH transmission should be more than 25 microseconds for an LBT procedure. In some embodiments, the communication device 190 may find out the length of the duration standard by means of time interval information via RRC layer, MAC layer, and/or physical layer signals.

When the time interval DST between the first UL transmission ULT1 to be performed and the second UL transmission ULT2 to be performed is less than a duration standard, the communication device 190 may perform beam alignment related procedure. In some embodiments, the communication device 190 may determine a third spatial domain filter to perform an LBT procedure CDLBT for both the first UL transmission ULT1 and the second UL transmission ULT2 since the LBT procedure CDLBT can only be done in one beam direction at a time. In other words, the communication device 190 may transmit a plurality of channel(s)/signal(s) with the same beam direction (or spatial domain filter, QCL assumption) in the method 90. In some embodiments, the communication device 190 may determine a third spatial domain filter for transmitting at least one of first UL transmission ULT1 or the second UL transmission ULT2. In some embodiments, at least one of first UL transmission ULT1 or the second UL transmission ULT2 is transmitted by the third spatial domain filter.

Figure 10:
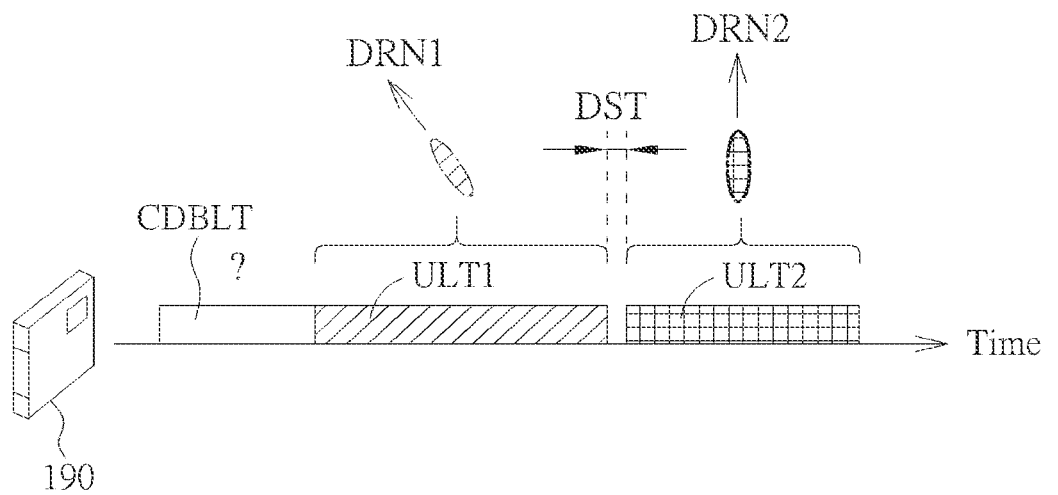
FIG. 10 to FIG. 12 are schematic diagrams associated with the method shown in FIG. 9.
Figure 10:
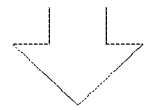
Figure 10:
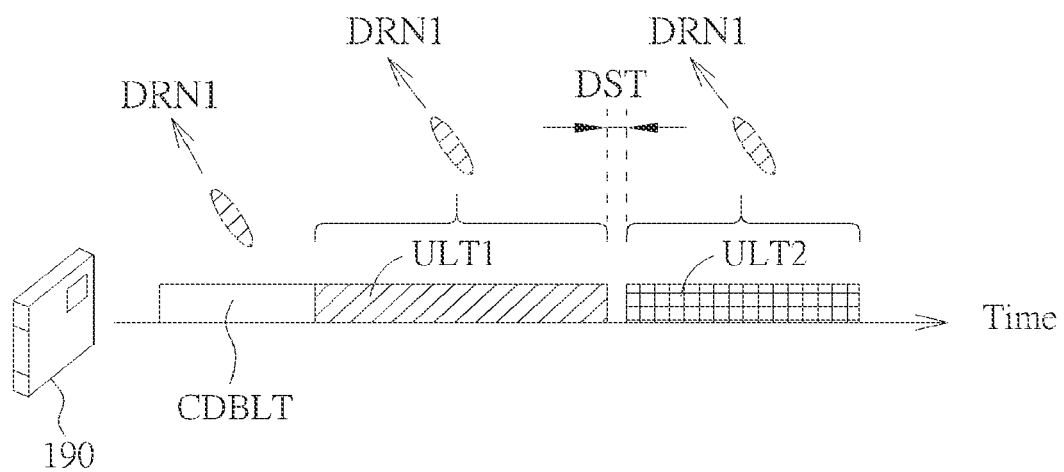

The third spatial domain filter may be chosen from spatial domain filters to perform the following UL transmissions according to significance or transmission timing of the following UL transmissions. FIG. 10 is a schematic diagram associated with the method 90 shown in FIG. 9. In FIG. 10, a dashed thick line with dots denotes approximate extent of the beam coverage of the communication device 190 for the LBT procedure CDLBT, the first UL transmission ULT1, or the second UL transmission ULT2. The transmission sequences before and after decision of the third spatial domain filter in the time domain are illustrated at the top and bottom of FIG. 10 respectively.

In FIG. 10, the first UL transmission ULT1 is indicated to be performed with a first spatial domain filter DRN1 via a first beam indicator. The second UL transmission ULT2 is indicated to be performed with a second spatial domain filter DRN2 via a second beam indicator. In some embodiments, the communication device 190 selects a specific spatial domain filter (that is, the first spatial domain filter DRN1) to perform the LBT procedure CDLBT, the first UL transmission ULT1 and the second UL transmission ULT2 according to the priorities of configuration signals for indicating beam direction, spatial domain filter, or QCL assumption in the method 90.

In some embodiments, the communication device 190 selects a specific spatial domain filter (that is, a first spatial domain filter DRN1) to perform the LBT procedure CDLBT, the first UL transmission ULT1 and the second UL transmission ULT2 according to channel/signal types in the method 90. In this case, channel/signal type of the first UL transmission ULT1 may affect its priority; channel/signal type of the second UL transmission ULT2 may affect its priority. For example, a PUCCH transmission has priority over a PUSCH transmission scheduled with spatial domain filter indicated by physical layer, and hence the communication device 190 selects the spatial domain filter for transmitting the PUCCH signal to perform the LBT procedure CDLBT, the PUCCH transmission and the PUCCH transmission. In some embodiments, a priority order among transmission may be: MAC layer may qualify for the first priority; the second priority may reside in RRC layer; physical layer may be accorded a third priority; the fourth priority is given to a transmission scheduled without beam indicator. In some embodiments, a priority order among transmission may be: PUCCH transmission may qualify for the first priority; the second priority may reside in Aperiodic SRS transmission; PUSCH transmission scheduled with spatial domain filter indicated by physical layer may be accorded a third priority; the fourth priority is given to PUSCH transmission scheduled without beam indicator.

In some embodiments, the communication device 190 selects a specific spatial domain filter (that is, the first spatial domain filter DRN1) to perform the LBT procedure CDLBT, the first UL transmission ULT1 and the second UL transmission ULT2 according to UL signal/information contents in the method 90. In this case, signal/information content of the first UL transmission ULT1 may affect its priority; signal/information content of the second UL transmission ULT2 may affect its priority. For example, a PUCCH transmission including hybrid automatic repeat request (HARQ) has priority over a PUCCH transmission including scheduling request, and hence the communication device 190 selects the spatial domain filter for PUCCH transmission including HARQ to perform the LBT procedure CDLBT, the former PUCCH transmission and the latter PUCCH transmission. In some embodiments, a priority order among transmission may be: HARQ (for instance, PUCCH including HARQ for DL assignment) may qualify for the first priority; the second priority may reside in scheduling request; CSI (for instance, PUSCH including CSI) may be accorded a third priority; the fourth priority is given to channel(s)/signal(s) without uplink control information (UCI).

As set forth above, in some embodiments, the third spatial domain filter is associated with either the first spatial domain filter DRN1 or the second spatial domain filter. In some embodiments, the third spatial domain filter is either the first spatial domain filter DRN1 or the second spatial domain filter DRN2. In some embodiments, the third spatial domain filter is determined according to a priority rule between the first uplink transmission and the second uplink transmission. In some embodiments, the third spatial domain filter is (or equals) the first spatial domain filter DRN1 when the priority of the first UL transmission ULT1 is higher than the priority of the second UL transmission ULT2. In some embodiments, the third spatial domain filter is (or equals) the second spatial domain filter DRN2 belonging to the second UL transmission ULT2 with higher priority than the priority of the first UL transmission ULT1. In the method 90, the first UL transmission ULT1 and the second UL transmission ULT2 are performed according to the third direction.

In some embodiments, the communication device 190 may transmit a plurality of channel(s)/signal(s) with the same beam direction, spatial domain filter, or QCL assumption according to the transmission timing (for example, according to the first UL channel(s)/signal(s) intent on transmission). In some embodiments, the third spatial domain filter is determined according to a chronological order between the first uplink transmission and the second uplink transmission. In some embodiments, the third spatial domain filter is (or equals) the first spatial domain filter DRN1 when the first UL transmission ULT1 is scheduled prior to the second UL transmission ULT2 as shown in FIG. 10. In some embodiments, the third spatial domain filter is (or equals) the second spatial domain filter DRN2 when the second UL transmission ULT2 is scheduled prior to the first UL transmission ULT1.

Figure 11:
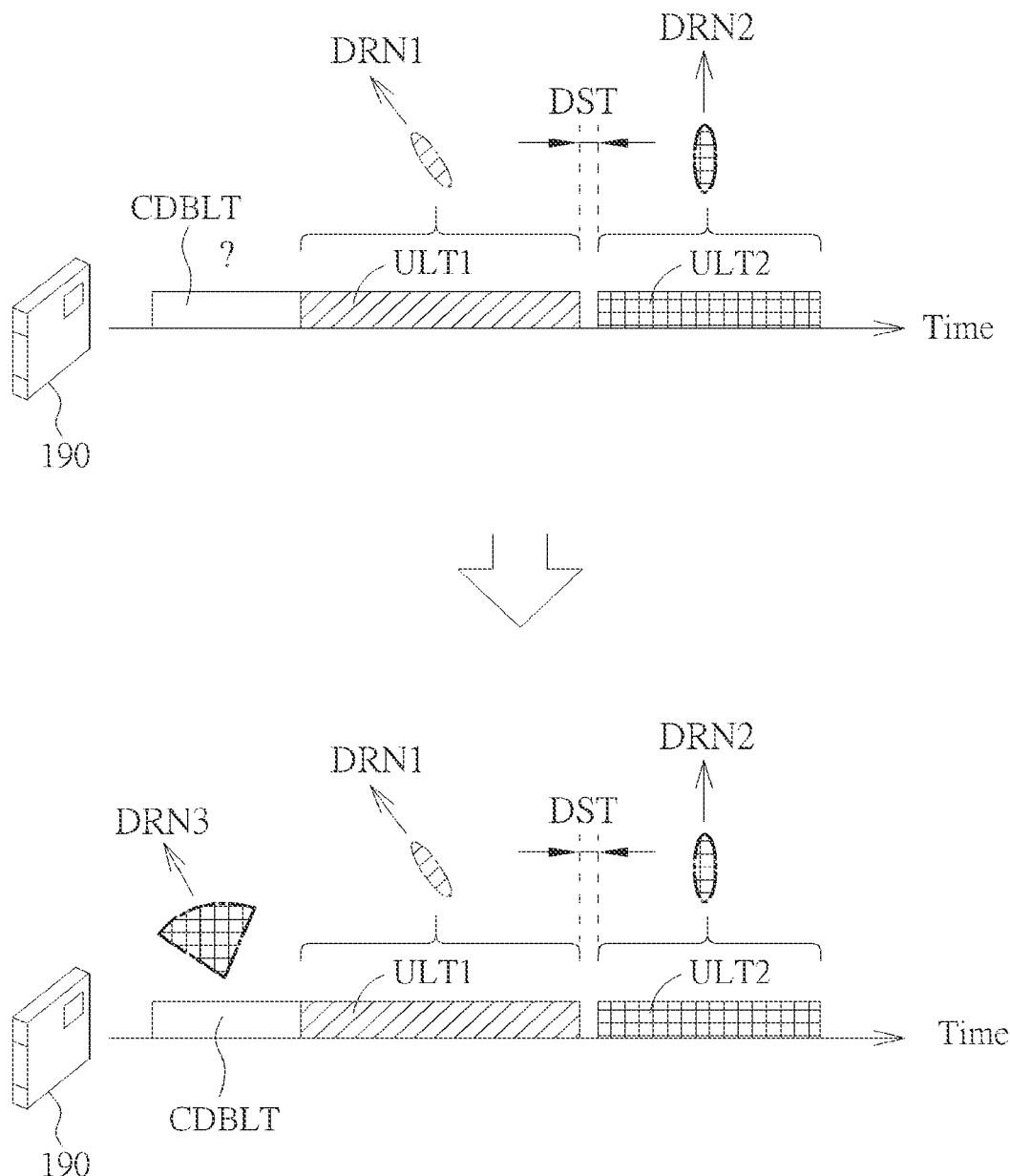
Figure 12:
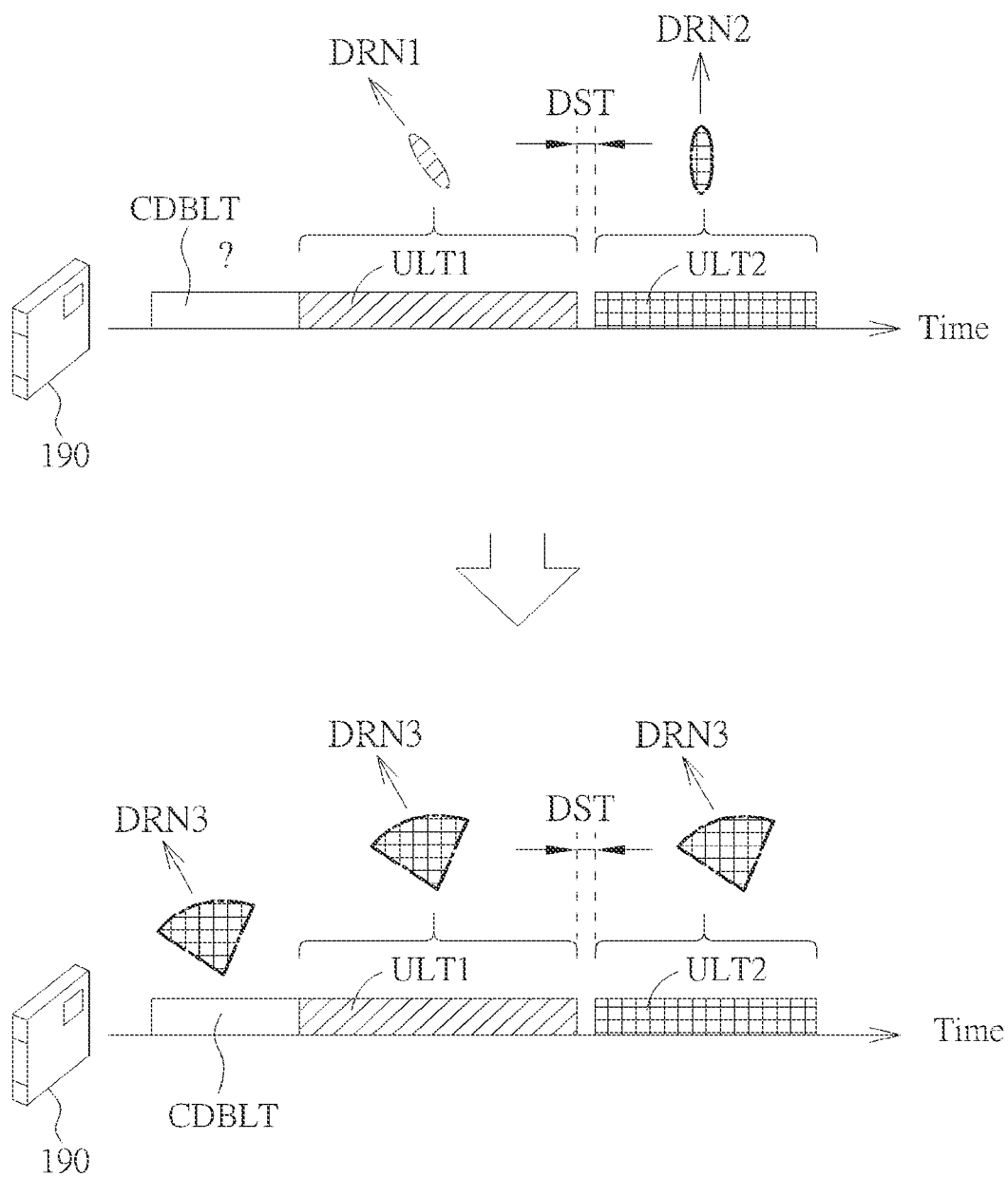

The third spatial domain filter may differ from spatial domain filters to perform the following UL transmissions, but may be associated with the spatial domain filters to perform the following UL transmissions. FIG. 11 and FIG. 12 are schematic diagrams associated with the method 90 shown in FIG. 9. In FIG. 11 and FIG. 12, the first UL transmission ULT1 is indicated to be performed with a first spatial domain filter DRN1 via a first beam indicator. The second UL transmission ULT2 is indicated to be performed with a second spatial domain filter DRN2 via a second beam indicator. The communication device 190 selects a specific spatial domain filter (that is, a third spatial domain filter DRN3) to perform the LBT procedure CDLBT and the following UL transmissions in the method 90.

In some embodiments, the third spatial domain filter DRN3 differs from either the first spatial domain filter DRN1 or the second spatial domain filter DRN2; however, the third spatial domain filter DRN3 is associated with the first spatial domain filter DRN1 and the second spatial domain filter DRN2. In some embodiments, the base station BS transmits a synchronization signal block (SSB) signal with width beamwidth, a first DL reference signal (RS) with narrow width beamwidth, and a second DL RS with narrow width beamwidth. There is a relation between the SSB signal, the first DL RS, and the second DL RS. For example, in some embodiments, the QCL assumption of the first DL RS and the second DL RS indicate the same RS (for example, the SSB signal). In some embodiments, the SSB signal is associated with the first DL RS according to the QCL assumption. If the communication device 190 is able to receive the SSB signal, for example, with third spatial domain filter DRN3, the communication device 190 is able to receive the first DL RS, for example, with the first spatial domain filter DRN1. Similarly, the SSB signal is also associated with the second DL RS according to the QCL assumption. If the communication device 190 is able to receive the SSB signal with third spatial domain filter DRN3, the communication device 190 is able to receive the second DL RS, for example, with the second spatial domain filter DRN2.

In such a situation, the communication device 190 may determine spatial domain receiving filter for the LBT procedure CDLBT according to a spatial domain receiving filter for receiving the SSB signal. Then, the communication device 190 may perform the LBT procedure CDLBT by using the same spatial domain receiving filter for receiving the SSB signal. The first DL RS may correspond to the first UL transmission ULT1, and the second DL RS may correspond to the second UL transmission ULT2. The communication device 190 may perform the LBT procedure CDLBT with a third beam coverage corresponding to the SSB signal. The third beam coverage corresponding to the third spatial domain filter DRN3 covers a first beam coverage of the first UL transmission ULT1 corresponding to the first spatial domain filter DRN1 or/and a second beam coverage of the second UL transmission ULT2 corresponding to the second spatial domain filter DRN2. The third spatial domain filter DRN3 corresponding to the SSB signal may be derived according to the first spatial domain filter DRN1 corresponding to the first DL RS and the second spatial domain filter DRN2 corresponding to the first DL RS. In the method 90, the LBT procedure CDLBT for both the first UL transmission ULT1 and the second UL transmission ULT2 is performed with the third spatial domain filter DRN3. In some embodiments, the third spatial domain filter is determining according to a reference signal. The reference signal is a target reference signal for determining the first spatial domain filter DRN1 corresponding to the first UL transmission ULT1 corresponding to and the second spatial domain filter DRN2 corresponding to the second uplink transmission ULT2.

In FIG. 11, the first UL transmission ULT1 and the second UL transmission ULT2 are performed according to different spatial domain filters in the method 90. Specifically, the first UL transmission ULT1 is performed according to the first spatial domain filter DRN1; the second UL transmission ULT2 is performed according to the second spatial domain filter DRN2.

In FIG. 12, both the first UL transmission ULT1 and the second UL transmission ULT2 are performed according to the same spatial domain filter in the method 90. In some embodiments, the first spatial domain filter DRN1, the second spatial domain filter DRN2, and the third spatial domain filter DRN3 are the same. In some embodiments, the first spatial domain filter DRN1, the second spatial domain filter DRN2, and the third spatial domain filter DRN3 are determined according to a target reference signal In the method 90, the first UL transmission ULT1 and the second UL transmission ULT2 are performed according to the third spatial domain filter DRN3. The communication device 190 may determine spatial domain receiving filter for UL transmission(s) according to a spatial domain receiving filter for receiving the SSB signal. Then, the communication device 190 may perform UL transmission(s) by using the same spatial domain receiving filter for receiving the SSB signal.

With the method 90, spatial domain filter for a (directional) LBT procedure CDLBT may be determined even under different QCL assumptions for the following UL transmissions.

Figure 13:
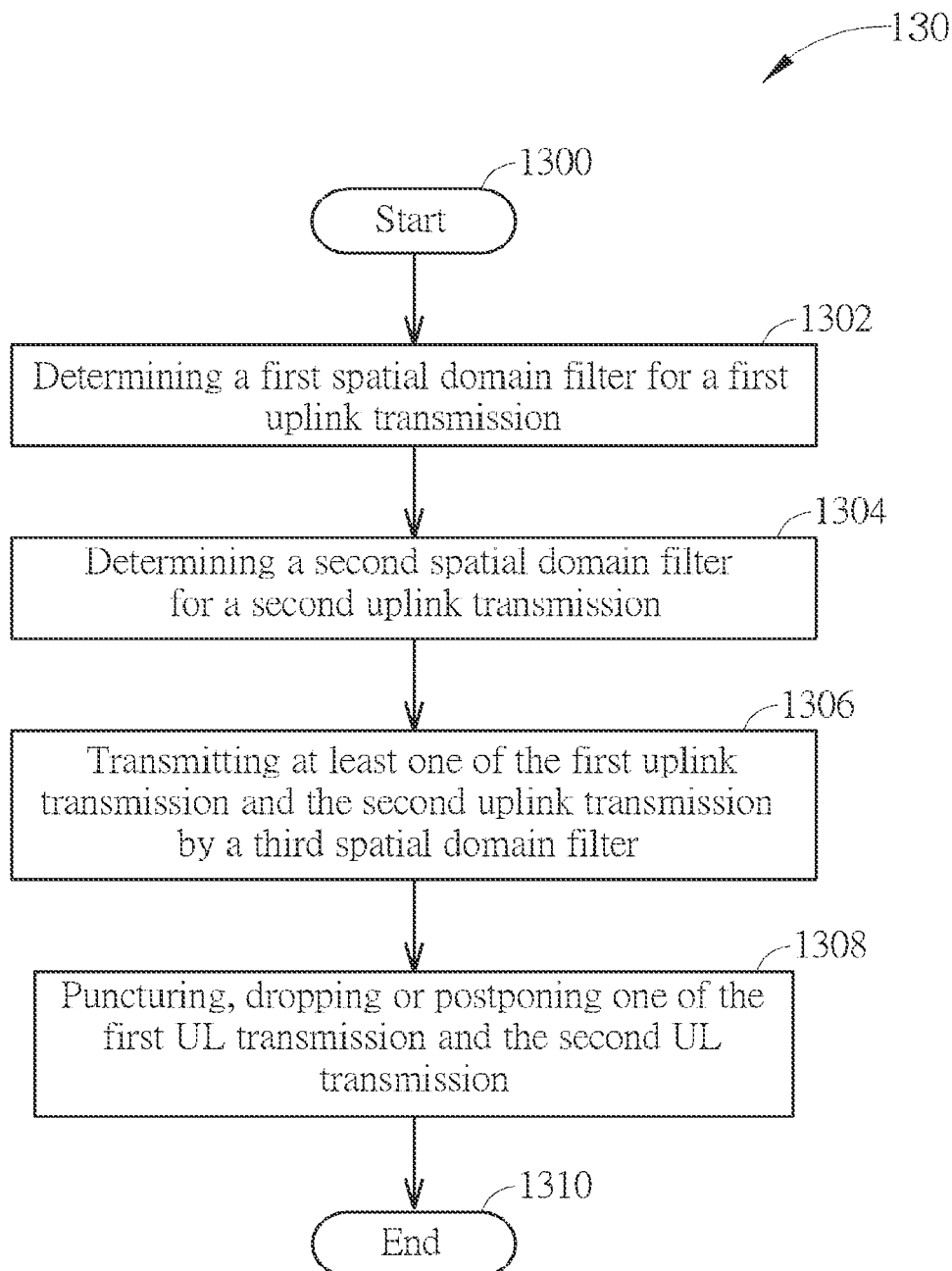
FIG. 13 is a flowchart of a method according to an example of the present invention.

FIG. 13 is a flowchart of a method 13 according to an example of the present invention. The method 13 may be utilized in a communication device 190, for handling an LBT procedure in an unlicensed band. The method 13 includes the following steps:

Step 1300: Start.

Step 1302: Determining a first spatial domain filter for a first uplink transmission.

Step 1304: Determining a second spatial domain filter for a second uplink transmission.

Step 1306: Transmitting at least one of the first uplink transmission and the second uplink transmission by a third spatial domain filter.

Step 1308: Puncturing, dropping or postponing one of the first UL transmission and the second UL transmission.

Step 1310: End.

Certain steps in the method 13 duplicate certain steps in the method 90. For instance, Step 1302 and Step 1304 are similar to Step 902 and Step 904 respectively, and hence are not detailed redundantly. In some embodiments of the method 90, the communication device 190 performs a first LBT procedure (for example, a first LBT procedure CDLBT1 shown in FIG. 14) in an unlicensed band for one of the first UL transmission ULT1 and the second UL transmission ULT2 with the same beam direction or spatial domain filter to perform the following UL transmission. Suppose the first LBT procedure CDLBT1 comes before the first UL transmission ULT1 and the second UL transmission ULT2 during the channel occupancy time in time or order. The beam direction or spatial domain filter to perform the first LBT procedure CDLBT1 is identical to the beam direction or spatial domain filter to perform the subsequent UL transmission (the first UL transmission ULT1 or the second UL transmission ULT2). Chances are that the first UL transmission ULT1 to be performed and the second UL transmission ULT2 to be performed may be overlapped or spaced apart by a limited time interval (for example, a time interval DST shown in FIG. 14). However, beam from the communication device 190 may only focus in one beam direction at a time. The communication device 190 may find out the infeasibility of the first LBT procedure CDLBT1 adopted for both the first UL transmission ULT1 with the first spatial domain filter DRN1 and the second UL transmission ULT2 with the second spatial domain filter DRN2 according to the short time interval DST therebetween or the (partial) overlap therebetween. In such a situation, the communication device 190 transmitting at least one of the first UL transmission ULT1 and the second UL transmission ULT2 by a third spatial domain filter in Step 1306. In Step 1308, one of the first UL transmission and the second UL transmission is punctured or dropped.

Figure 14:
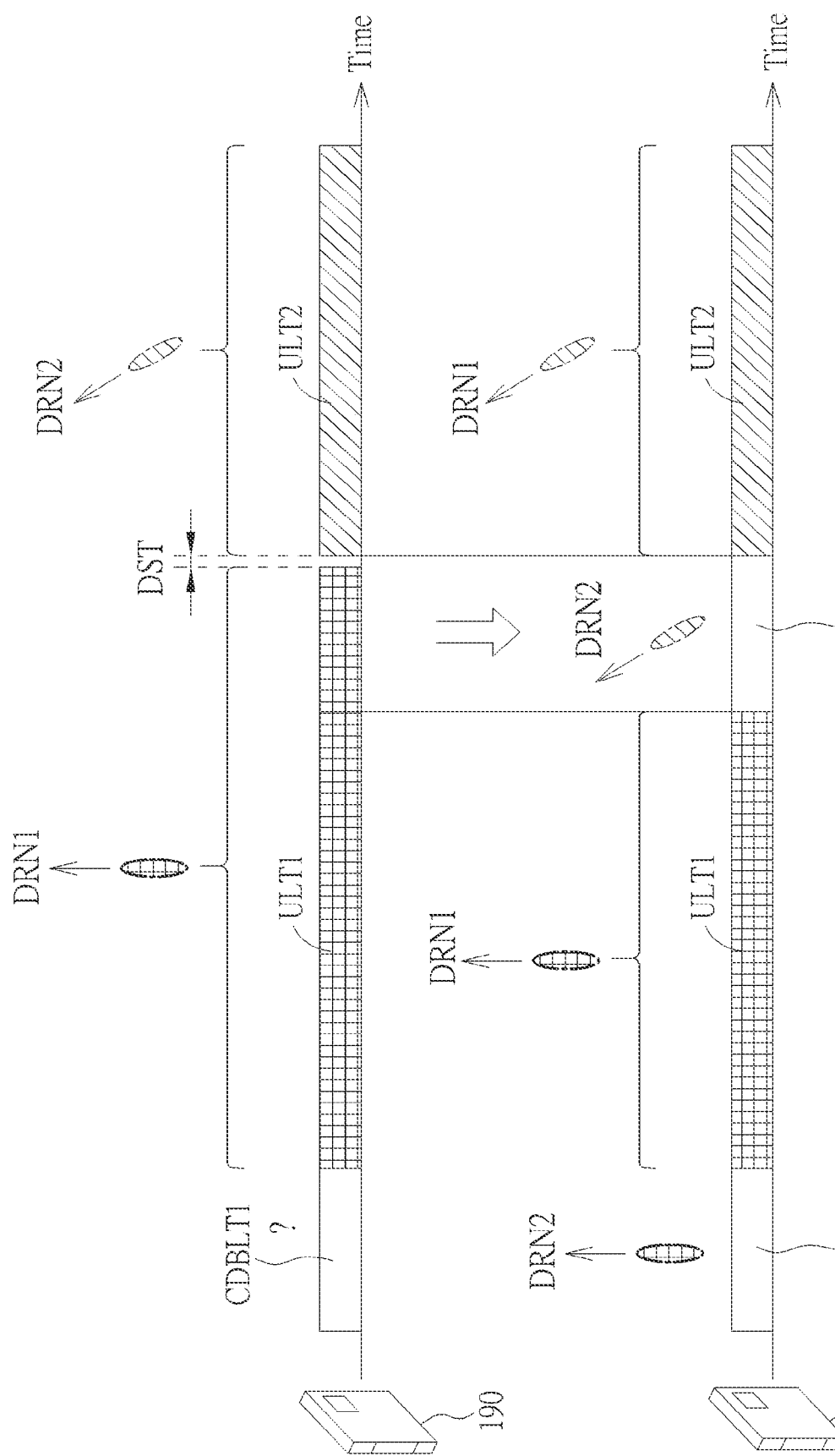
FIG. 14 to FIG. 17 are schematic diagrams associated with the method shown in FIG. 13.

To determine beam direction or spatial domain filter for the (directional) first LBT procedure CDLBT1, please refer to FIG. 14. FIG. 14 is a schematic diagram associated with the method 13 shown in FIG. 13. In FIG. 14, a dashed thick line with dots denotes approximate extent of the beam coverage of the communication device 190 for the first LBT procedure CDLBT1, a second LBT procedure CDLBT2, the first UL transmission ULT1, or the second UL transmission ULT2. The transmission sequences before and after the adoption of the method 13 in the time domain are illustrated at the top and bottom of FIG. 14 respectively.

In FIG. 14, the first UL transmission ULT1 is performed before the second UL transmission ULT2, while the second UL transmission ULT2 takes priority over the first UL transmission ULT1. In such a situation, the communication device 190 performs the first LBT procedure CDLBT1 for the first UL transmission ULT1 with a first spatial domain filter DRN1 in Step 1306. Furthermore, a portion of the first UL transmission ULT1 with lower priority may be punctured in Step 1308. In this manner, the communication device 190 is able perform the second LBT procedure CDLBT2 in an unlicensed band for the second UL transmission ULT2 (which is ranked as a higher priority) with the second spatial domain filter DRN2 different from the first spatial domain filter DRN1 for the first UL transmission ULT1, which is ranked as a lower priority. By means of the puncturing, there may be enough time for the second LBT procedure CDLBT2 because there are no prior UL transmissions before the head (front) portion of the second UL transmission ULT2. In other words, the first UL transmission ULT1 is punctured when the priority of the second UL transmission ULT2 is higher than the priority of the first UL transmission ULT1.

In some embodiments, the UL transmission with lower priority (that is, the first UL transmission ULT1) is tail-punctured. In other words, the tail (back) portion of the UL transmission with lower priority is punctured. In some embodiments, an insignificant portion of the UL transmission with lower priority (that is, the first UL transmission ULT1) is punctured. The insignificant portion may be head (front) portion, tail portion, or discrete portion. In some embodiments, the puncturing involves recoding.

Figure 15:
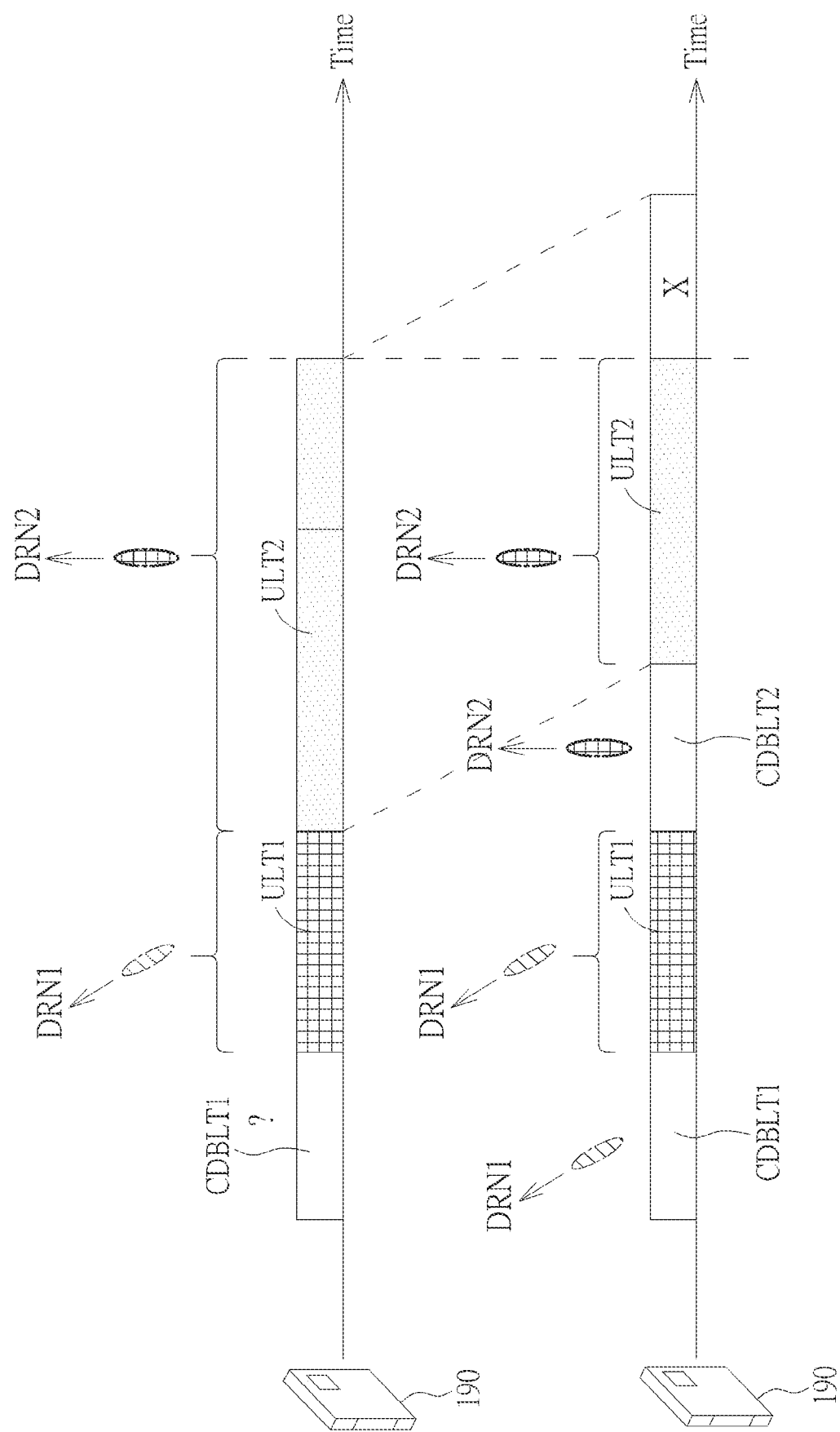

To determine beam direction or spatial domain filter for the (directional) first LBT procedure CDLBT1, please refer to FIG. 15. FIG. 15 is a schematic diagram associated with the method 13 shown in FIG. 13. In FIG. 15, the first UL transmission ULT1 is performed before the second UL transmission ULT2, while the second UL transmission ULT2 takes priority over the first UL transmission ULT1. In such a situation, the communication device 190 performs the first LBT procedure CDLBT1 for UL channel/signal with higher priority (that is, the second UL transmission ULT2) with a second spatial domain filter DRN2 in Step 1306. Furthermore, UL channel/signal with lower priority (that is, the first UL transmission ULT1) may be dropped in Step 1308. By means of the dropping, there may be enough time for the communication device 190 to perform the first LBT procedure CDLBT1 for the second UL transmission ULT2 with higher priority, because there are no prior UL transmissions before the head (front) portion of the second UL transmission ULT2. In other words, the first UL transmission ULT1 is dropped, when the priority of the second UL transmission ULT2 is higher than the priority of the first UL transmission ULT1.

In some embodiments, the first UL transmission ULT1 is dropped in Step 1308 especially when the length of the first UL transmission ULT1 is less than a length standard. The length standard may be configured by the base station BS or may be a predetermined value.

Figure 16:
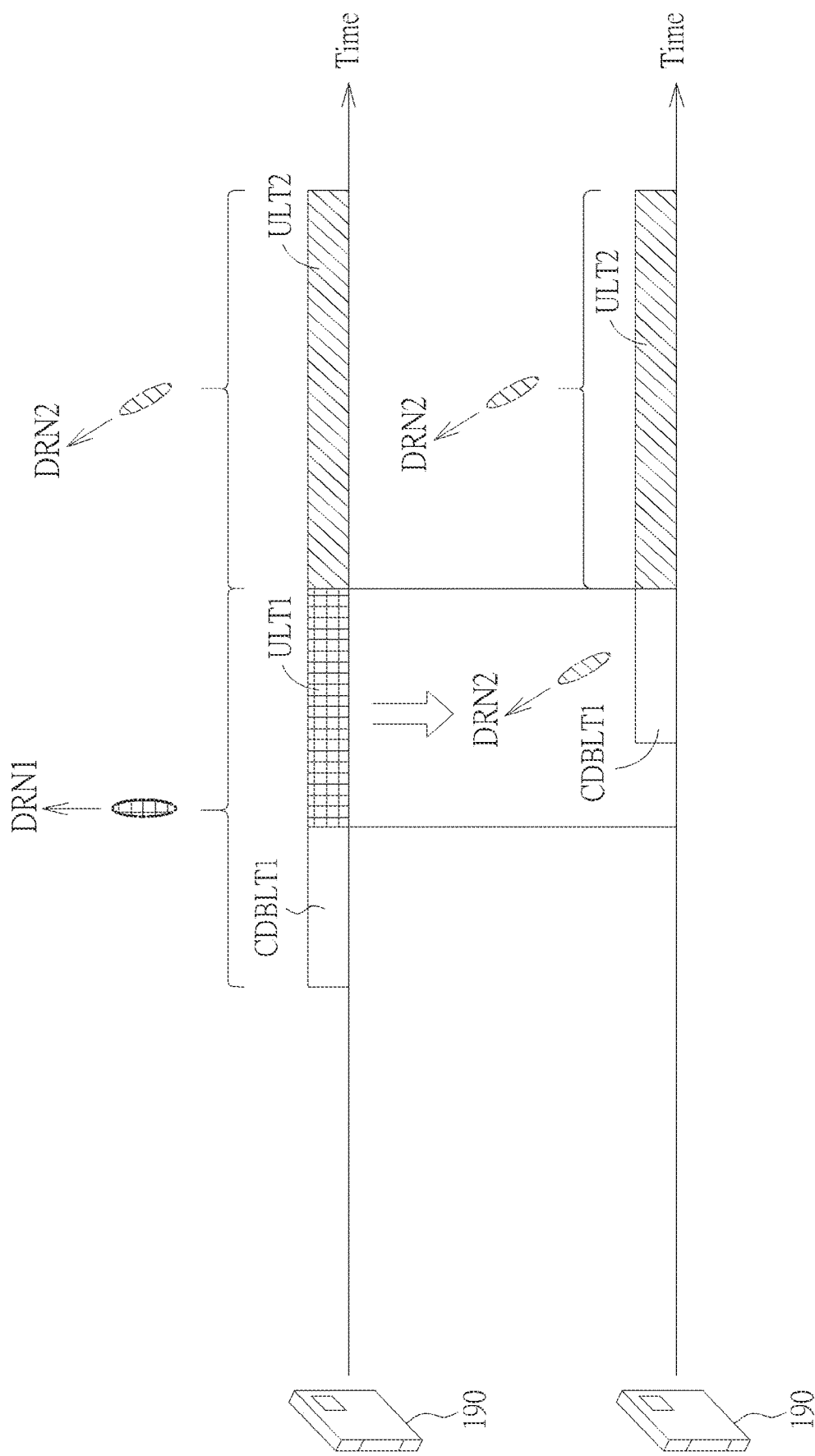

To determine beam direction or spatial domain filter for the (directional) first LBT procedure CDLBT1, please refer to FIG. 16. FIG. 16 is a schematic diagram associated with the method 13 shown in FIG. 13. In FIG. 16, the first UL transmission ULT1 is performed before the second UL transmission ULT2, and the first UL transmission ULT1 takes priority over the second UL transmission ULT2. In such a situation, the communication device 190 performs the first LBT procedure CDLBT1 for the first UL transmission ULT1 with a first spatial domain filter DRN1 in Step 1306. Furthermore, the latter UL channel/signal (that is, second UL transmission ULT2) ranked as a lower priority may be postponed and the latter part of the second UL transmission ULT2 may be punctured in Step 1308. In other words, the UL transmission (that is, the second UL transmission ULT2) with lower priority may be postponed (especially when the second UL transmission ULT2 comes after the first UL transmission ULT1). Besides, a portion of the UL transmission (that is, the second UL transmission ULT2) with lower priority may be punctured (especially when the second UL transmission ULT2 comes after the first UL transmission ULT1).

In this manner, the communication device 190 is able perform a second LBT procedure CDLBT2 for the second UL transmission ULT2 (which is ranked as a lower priority) with the second spatial domain filter DRN2 different from the first spatial domain filter DRN1 for the first UL transmission ULT1, which is ranked as a higher priority. By means of the puncturing, there may be enough time for the second LBT procedure CDLBT2 because there are no prior UL transmissions before the head (front) portion of the second UL transmission ULT2. In other words, the second UL transmission ULT2 is punctured when the priority of the first UL transmission ULT1 is higher than the priority of the second UL transmission ULT2.

In some embodiments, the UL transmission with lower priority (that is, second UL transmission ULT2) is tail-punctured. In other words, the tail (back) portion of the UL transmission with lower priority is punctured. In some embodiments, an insignificant portion of the UL transmission with lower priority (that is, second UL transmission ULT2) is punctured. The insignificant portion may be head (front) portion, tail portion, or discrete portion. In some embodiments, the puncturing involves recoding.

Figure 17:
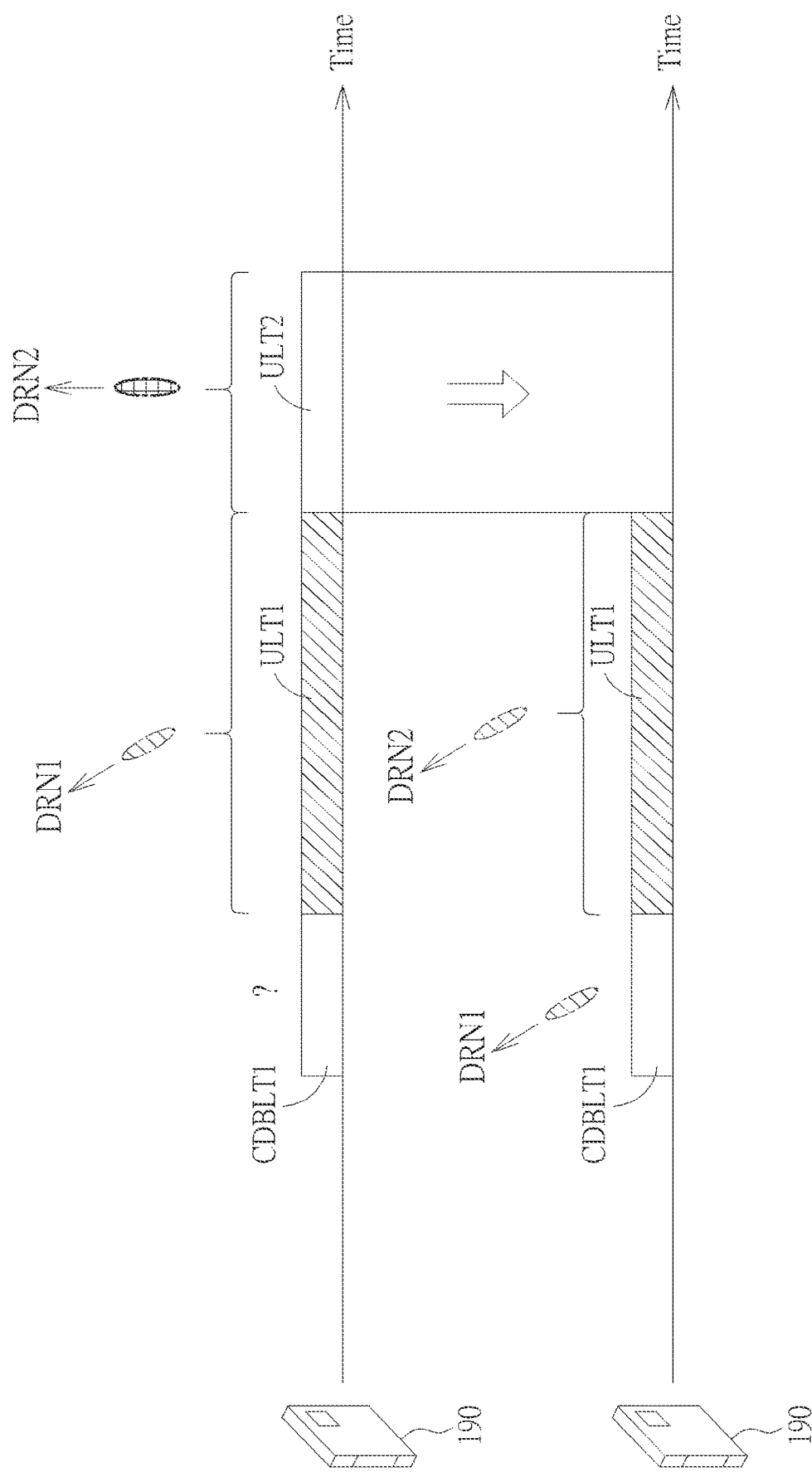

To determine beam direction or spatial domain filter for the (directional) first LBT procedure CDLBT1, please refer to FIG. 17. FIG. 17 is a schematic diagram associated with the method 13 shown in FIG. 13. In some embodiments, the first UL transmission ULT1 is performed before the second UL transmission ULT2, and the first UL transmission ULT1 takes priority over the second UL transmission ULT2. In such a situation, the communication device 190 performs the first LBT procedure CDLBT1 for UL channel/signal with higher priority (that is, the first UL transmission ULT1) with a first spatial domain filter DRN1 in Step 1306. Furthermore, UL channel/signal with lower priority (that is, the second UL transmission ULT2) may be dropped in Step 1308. In other words, the second UL transmission ULT2 is dropped when the priority of the first UL transmission ULT1 is higher than the priority of the second UL transmission ULT2. In some embodiments, the second UL transmission ULT2 is dropped in Step 1308 especially when the length of the second UL transmission ULT2 is less than a length standard. The length standard may be configured by the base station BS or may be a predetermined value.

With the method 13, beam direction or spatial domain filter for a (directional) first LBT procedure CDLBT1 may be determined even under different QCL assumptions for the following UL transmissions.

Figure 18:
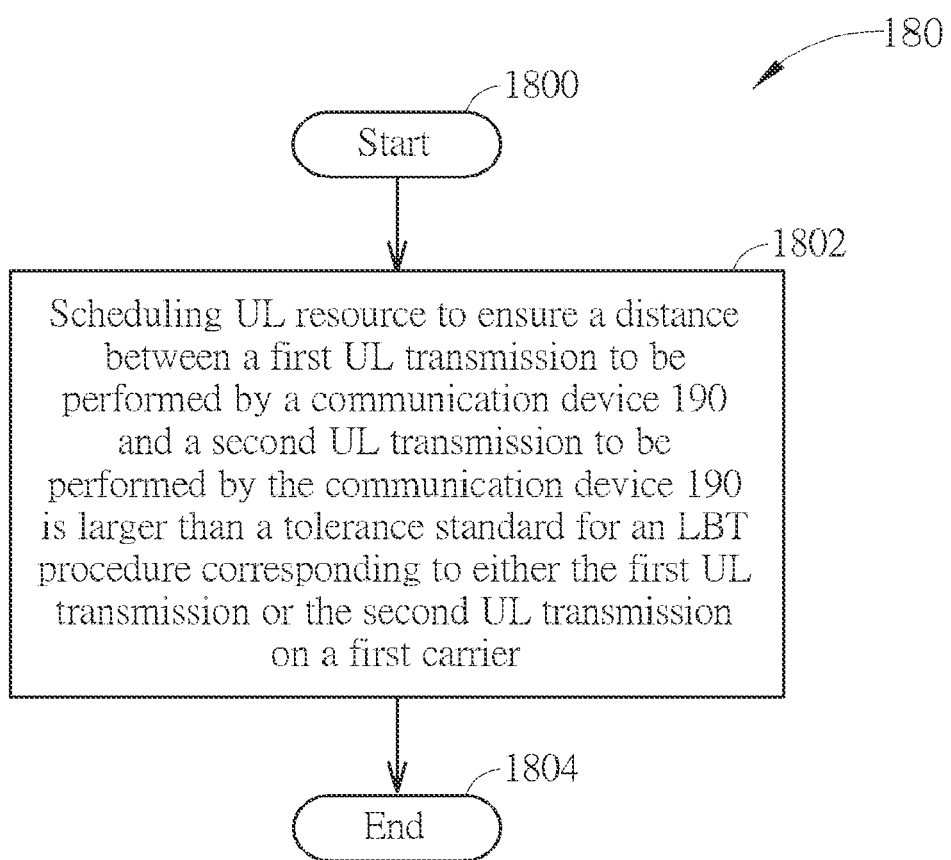
FIG. 18 is a flowchart of a method according to an example of the present invention.

FIG. 18 is a flowchart of a method 18 according to an example of the present invention. The method 18 may be utilized in a base station BS, for handling an LBT procedure in an unlicensed band. The method 18 includes the following steps:

Step 1800: Start.

Step 1802: Scheduling UL resource to ensure a distance between a first UL transmission to be performed by a communication device 190 and a second UL transmission to be performed by the communication device 190 is larger than a tolerance standard for an LBT procedure corresponding to either the first UL transmission or the second UL transmission on a first carrier.

Step 1804: End.

Suppose the first UL transmission is performed before the second UL transmission during the channel occupancy time. The communication device 190 may not expect that the first UL transmission and the second UL transmission have different QCL assumption. To solve problems resulted from different QCL assumptions, the base station BS may schedule UL resource so that a distance (such as a time interval and/or a time distance) between a first UL transmission to be performed by the communication device 190 and a second UL transmission to be performed by the communication device 190 is longer than a tolerance standard (such as a duration standard). In this manner, there would be enough time for a second LBT procedure in an unlicensed band corresponding to the second UL transmission. More specifically, after the first UL transmission is performed by the communication device 190, the time interval of microseconds comes to serve as a gap. The time interval will give the communication device 190 time to perform the second LBT procedure for the second UL transmission. Since the second LBT procedure corresponding to the second UL transmission is performed by the communication device 190 during the time interval, the time interval should be no less than the tolerance standard, which may be predetermined in a standard/specification, configured by the base station BS or fixed. In some embodiments, the tolerance standard is associated with priorities of the first UL transmission and the second UL transmission. In some embodiments, the length of the duration standard may depend on types of UL channel(s)/signal(s), for example, the channel/signal type of the first UL transmission or the second UL transmission.

Similarly, to solve problems resulted from different QCL assumptions, the base station BS may schedule UL resource so that a distance (such as a frequency difference and/or a frequency distance) between a first UL transmission to be performed by the communication device 190 and a second UL transmission to be performed by the communication device 190 is larger than a tolerance standard (such as a difference standard). In some embodiments, a frequency band for the first UL transmission may differ from a frequency band for the second UL transmission. In some embodiments, the first UL transmission and the second UL transmission may be in the same band or component carrier (CC) or within a frequency range. The frequency difference should be no less than the tolerance standard, which may be predetermined in a standard/specification configured by the base station BS, or fixed. In some embodiments, the tolerance standard is associated with priorities of the first UL transmission and the second UL transmission. In some embodiments, the magnitude of the tolerance standard may depend on types of UL channel(s)/signal(s), for example, the channel/signal type of the first UL transmission or the second UL transmission.

With the method 18, there is no need to solve fairness problems, which occur when the communication device 190 performs a shorter LBT procedure without taking its beamwidth (of each panel) into account. In addition, it is not necessary for the communication device 190 to determine beam direction or spatial domain filter for a (directional) LBT procedure under different QCL assumptions for the following UL transmissions.

In summary, the present invention adjusts at least one parameter of the communication device to solve fairness problems. The present invention determines a third spatial domain filter to perform an LBT procedure for both the first UL transmission and the second UL transmission according to a sophisticated algorithm even under different QCL assumptions for the following UL transmissions. Alternatively, the present invention punctures or drops certain UL transmission to ensure an LBT procedure according to another sophisticated algorithm under different QCL assumptions for the following UL transmissions. A base station of the present invention may schedule UL resource to avoid fairness problems or problems resulted from different QCL assumptions.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A device for handling channel access procedure, comprising:
a processing circuit; and
a storage device, coupled to the processing circuit;
wherein the processing circuit is configured to execute instructions stored in the storage device to:
perform a channel access procedure according to at least one sensing beam before a channel occupancy; and
perform transmissions in different beams during the channel occupancy when a channel is accessed, wherein the at least one sensing beam covers at least one transmission beam.

2. The device of claim 1, wherein the at least one sensing beam covers all of the at least one transmission beam during the channel occupancy.

3. The device of claim 1, wherein each of the at least one sensing beam covers one of the at least one transmission beam during the channel occupancy.

4. The device of claim 1, wherein the different beams are multiplexed in a spatial domain.

5. The device of claim 1, wherein the different beams are multiplexed in a time domain.

6. The device of claim 1, wherein each of the transmissions performed during the channel occupancy is transmitted after a sensing duration.

7. The device of claim 6, wherein the sensing duration is fixed.

8. The device of claim 1, wherein the at least one sensing beam is determined according to a spatial domain transmission filter associated with a sound reference signal (SRS) resource indicator (SRI).

9. The device of claim 8, wherein the spatial domain transmission filter is used for performing an uplink (UL) transmission.

10. The device of claim 9, wherein the UL transmission is performed in a physical uplink control channel (PUCCH) or a physical downlink share channel (PUSCH).

11. The device of claim 8, wherein the SRI is indicated in downlink control information (DCI).

12. The device of claim 1, wherein the channel access procedure is performed according to an energy detection threshold.

13. The device of claim 12, wherein the energy detection threshold is adjusted by the device.

* * * * *